US012589575B2

(12) United States Patent
Ponce Cabrera et al.

(10) Patent No.: US 12,589,575 B2
(45) Date of Patent: Mar. 31, 2026

(54) LASER METHODS FOR PROCESSING ELECTROCHROMIC GLASS

(71) Applicant: View, Inc., Milpitas, CA (US)

(72) Inventors: Luis Vidal Ponce Cabrera, Olive Branch, MS (US); Abhishek Anant Dixit, Collierville, TN (US); Anshu Ajit Pradhan, Collierville, TN (US); Eithan Ritz, Memphis, TN (US)

(73) Assignee: View Operating Corporation, San Jose, CA (US)

( * ) Notice: Subject to any disclaimer, the term of this patent is extended or adjusted under 35 U.S.C. 154(b) by 794 days.

(21) Appl. No.: 17/783,249

(22) PCT Filed: Dec. 7, 2020

(86) PCT No.: PCT/US2020/063672
§ 371 (c)(1),
(2) Date: Jun. 7, 2022

(87) PCT Pub. No.: WO2021/118941
PCT Pub. Date: Jun. 17, 2021

(65) Prior Publication Data
US 2023/0029868 A1 Feb. 2, 2023

Related U.S. Application Data

(60) Provisional application No. 62/946,166, filed on Dec. 10, 2019.

(51) Int. Cl.
*B32B 17/10* (2006.01)
*B23K 26/36* (2014.01)
(Continued)

(52) U.S. Cl.
CPC ........ *B32B 17/10128* (2013.01); *B23K 26/36* (2013.01); *B32B 17/10055* (2013.01);
(Continued)

(58) Field of Classification Search
CPC ........ B32B 17/10128; B32B 17/10055; B32B 17/10513; B32B 17/10908; B23K 26/36;
(Continued)

(56) References Cited

U.S. PATENT DOCUMENTS

| | | | |
|---|---|---|---|
| 4,854,675 A | 8/1989 | Yamazaki et al. | |
| 4,950,888 A | 8/1990 | Hamada | |

(Continued)

FOREIGN PATENT DOCUMENTS

| | | |
|---|---|---|
| CN | 1350326 A | 5/2002 |
| CN | 1482509 A | 3/2004 |

(Continued)

OTHER PUBLICATIONS

International Search report dated Jan. 4, 2021.
(Continued)

*Primary Examiner* — Sharrief I Broome
(74) *Attorney, Agent, or Firm* — Cha & Reiter, LLC

(57) ABSTRACT

Techniques are described for laser processing of electrochromic glass or other thin-film devices. A laser beam collimated to an angular divergence of 1 milliradian or less is directed onto a first position on a surface of a workpiece. The laser beam includes pulses of electromagnetic radiation directed to a spot having a characteristic dimension of at least about 5 mm at the surface of the workpiece. The laser beam removes the material from the first position, then is moved to a second position on the surface of the workpiece and removes material from the second position. The laser beam is then moved to one or more additional positions on the surface of the workpiece and removes material from the one or more additional positions.

37 Claims, 13 Drawing Sheets

(51) Int. Cl.

| | |
|---|---|
| *B23K 101/36* | (2006.01) |
| *G02F 1/155* | (2006.01) |
| *G02F 1/157* | (2006.01) |
| *G02F 1/161* | (2006.01) |

(52) U.S. Cl.
CPC .. *B32B 17/10513* (2013.01); *B32B 17/10908* (2013.01); *G02F 1/157* (2013.01); *G02F 1/161* (2013.01); *B23K 2101/36* (2018.08); *G02F 1/155* (2013.01)

(58) Field of Classification Search
CPC ..... B32K 2101/36; G02F 1/157; G02F 1/161; G02F 1/155
USPC ........................................................ 359/265
See application file for complete search history.

(56) References Cited

U.S. PATENT DOCUMENTS

| | | | |
|---|---|---|---|
| 5,724,175 | A | 3/1998 | Hichwa et al. |
| 5,830,336 | A | 11/1998 | Schulz |
| 5,877,936 | A | 3/1999 | Nishitani et al. |
| 5,995,271 | A | 11/1999 | Zieba et al. |
| 6,055,089 | A | 4/2000 | Schulz et al. |
| 6,176,715 | B1 | 1/2001 | Buescher |
| 6,284,412 | B1 | 9/2001 | Minakata et al. |
| 6,407,847 | B1 | 6/2002 | Poll et al. |
| 6,515,787 | B1 | 2/2003 | Westfall et al. |
| 6,822,778 | B2 | 11/2004 | Westfall et al. |
| 7,710,671 | B1 | 5/2010 | Kwak et al. |
| 7,719,751 | B2 | 5/2010 | Egerton et al. |
| 7,777,933 | B2 | 8/2010 | Piroux et al. |
| 7,869,114 | B2 | 1/2011 | Valentin et al. |
| 8,035,882 | B2 | 10/2011 | Fanton et al. |
| 8,071,420 | B2 | 12/2011 | Su et al. |
| 8,164,818 | B2 | 4/2012 | Collins et al. |
| 9,019,588 | B2 | 4/2015 | Brown et al. |
| 9,102,124 | B2 | 8/2015 | Collins et al. |
| 9,454,053 | B2 | 9/2016 | Strong et al. |
| 9,482,921 | B2 | 11/2016 | Lamine et al. |
| 9,581,875 | B2 | 2/2017 | Burdis et al. |
| 9,703,167 | B2 | 7/2017 | Parker et al. |
| 9,939,704 | B2 | 4/2018 | Patterson et al. |
| 9,952,481 | B2 | 4/2018 | Rozbicki et al. |
| 9,958,750 | B2 | 5/2018 | Parker et al. |
| 9,995,985 | B2 | 6/2018 | Parker et al. |
| 10,114,265 | B2 | 10/2018 | Strong et al. |
| 10,295,880 | B2 | 5/2019 | Dixit et al. |
| 10,303,032 | B2 | 5/2019 | Brossard et al. |
| 10,409,130 | B2 | 9/2019 | Parker et al. |
| 10,551,711 | B2 | 2/2020 | Kozlowski et al. |
| 10,795,232 | B2 | 10/2020 | Strong et al. |
| 10,802,371 | B2 | 10/2020 | Dixit et al. |
| 11,065,845 | B2 | 7/2021 | Parker et al. |
| 11,086,182 | B2 | 8/2021 | Dixit et al. |
| 2002/0075552 | A1 | 6/2002 | Poll et al. |
| 2002/0149829 | A1 | 10/2002 | Mochizuka et al. |
| 2003/0137712 | A1 | 7/2003 | Westfall et al. |
| 2003/0227663 | A1 | 12/2003 | Agrawal et al. |
| 2004/0042059 | A1 | 3/2004 | Minami et al. |
| 2004/0202001 | A1 | 10/2004 | Roberts et al. |
| 2004/0234678 | A1 | 11/2004 | Hirai et al. |
| 2006/0018000 | A1 | 1/2006 | Greer |
| 2006/0098289 | A1 | 5/2006 | McCabe et al. |
| 2007/0138949 | A1 | 6/2007 | Yoshida et al. |
| 2008/0030836 | A1 | 2/2008 | Tonar et al. |
| 2008/0099065 | A1 | 5/2008 | Ito et al. |
| 2008/0190759 | A1 | 8/2008 | Valentin et al. |
| 2008/0266642 | A1 | 10/2008 | Burrell et al. |
| 2009/0272483 | A1 | 11/2009 | Howes |
| 2009/0304912 | A1 | 12/2009 | Kwak et al. |
| 2009/0323162 | A1 | 12/2009 | Fanton et al. |
| 2010/0067090 | A1 | 3/2010 | Egerton et al. |
| 2010/0193483 | A1* | 8/2010 | Chen ................. B23K 26/0823 |
| | | | 219/121.72 |

| | | | |
|---|---|---|---|
| 2010/0243427 | A1 | 9/2010 | Kozlowski et al. |
| 2010/0245973 | A1 | 9/2010 | Wang et al. |
| 2010/0321758 | A1 | 12/2010 | Bugno et al. |
| 2011/0096388 | A1 | 4/2011 | Agrawal et al. |
| 2011/0148218 | A1 | 6/2011 | Rozbicki |
| 2011/0151383 | A1 | 6/2011 | Yamashiro et al. |
| 2011/0199666 | A1 | 8/2011 | Chun et al. |
| 2011/0211247 | A1 | 9/2011 | Kozlowski et al. |
| 2011/0260961 | A1 | 10/2011 | Burdis |
| 2011/0266137 | A1 | 11/2011 | Wang et al. |
| 2011/0266138 | A1 | 11/2011 | Wang et al. |
| 2011/0267673 | A1 | 11/2011 | Agrawal et al. |
| 2011/0267674 | A1 | 11/2011 | Wang et al. |
| 2011/0267675 | A1 | 11/2011 | Wang et al. |
| 2012/0026573 | A1 | 2/2012 | Collins et al. |
| 2012/0033287 | A1 | 2/2012 | Friedman et al. |
| 2012/0147449 | A1 | 6/2012 | Bhatnagar et al. |
| 2012/0218620 | A1 | 8/2012 | Kwak et al. |
| 2012/0327499 | A1 | 12/2012 | Parker et al. |
| 2013/0222877 | A1 | 8/2013 | Greer et al. |
| 2013/0278988 | A1 | 10/2013 | Jack et al. |
| 2014/0253996 | A1 | 9/2014 | Burdis et al. |
| 2014/0340731 | A1* | 11/2014 | Strong .................... G02F 1/155 |
| | | | 359/275 |
| 2015/0092260 | A1 | 4/2015 | Parker et al. |
| 2015/0153622 | A1 | 6/2015 | Kalweit et al. |
| 2015/0362816 | A1 | 12/2015 | Strong et al. |
| 2016/0103379 | A1 | 4/2016 | Kozlowski et al. |
| 2016/0114523 | A1 | 4/2016 | Luten et al. |
| 2016/0138328 | A1 | 5/2016 | Behmke et al. |
| 2016/0199936 | A1 | 7/2016 | Luten et al. |
| 2016/0334688 | A1* | 11/2016 | Tran ........................ G02F 1/153 |
| 2017/0066679 | A1 | 3/2017 | Yeh |
| 2017/0115544 | A1 | 4/2017 | Parker et al. |
| 2017/0176831 | A1 | 6/2017 | Dixit et al. |
| 2017/0219903 | A1 | 8/2017 | Strong et al. |
| 2018/0210307 | A1 | 7/2018 | Parker et al. |
| 2018/0259822 | A1 | 9/2018 | Dixit et al. |
| 2019/0079365 | A1 | 3/2019 | Sarrach et al. |
| 2019/0086756 | A1 | 3/2019 | Dixit et al. |
| 2019/0346732 | A1 | 11/2019 | Parker et al. |
| 2019/0375052 | A1* | 12/2019 | Hadano .................... H01S 3/10 |
| 2020/0384738 | A1 | 12/2020 | Strong et al. |
| 2021/0001426 | A1 | 1/2021 | Dixit et al. |
| 2021/0094125 | A1* | 4/2021 | Heider .................. B23K 26/14 |
| 2021/0394489 | A1 | 12/2021 | Strong et al. |
| 2022/0001651 | A1 | 1/2022 | Cabrera |
| 2022/0009825 | A1* | 1/2022 | Reutler .............. C03C 17/3411 |
| 2022/0032584 | A1 | 2/2022 | Parker et al. |
| 2022/0050348 | A1 | 2/2022 | Dixit et al. |
| 2022/0080706 | A1 | 3/2022 | Strong et al. |

FOREIGN PATENT DOCUMENTS

| | | | | |
|---|---|---|---|---|
| CN | 1537257 | A | 10/2004 | |
| CN | 1620678 | A | 5/2005 | |
| CN | 1688923 | A | 10/2005 | |
| CN | 1808271 | A | 7/2006 | |
| CN | 1993648 | A | 7/2007 | |
| CN | 101276079 | A | 10/2008 | |
| CN | 101421666 | A | 4/2009 | |
| CN | 102388340 | A | 3/2012 | |
| CN | 104011588 | A | 8/2014 | |
| EP | 3118912 | A1 * | 1/2017 | .......... H01M 50/536 |
| EP | 3238253 | A2 | 11/2017 | |
| JP | S5994744 | A | 5/1984 | |
| JP | 2001051307 | A | 2/2001 | |
| JP | 2001051308 | A | 2/2001 | |
| JP | 2001133816 | A | 5/2001 | |
| JP | 2002076390 | A | 3/2002 | |
| JP | 2008542578 | A | 11/2008 | |
| JP | 2011128504 | A | 6/2011 | |
| JP | 2011526378 | A | 10/2011 | |
| KR | 20040031685 | A | 4/2004 | |
| TW | 201013286 | A | 4/2010 | |
| TW | 201029838 | A | 8/2010 | |
| TW | 201215981 | A | 4/2012 | |
| TW | 201342509 | A | 10/2013 | |
| TW | 201435464 | A | 9/2014 | |

(56) References Cited

FOREIGN PATENT DOCUMENTS

| WO | WO-2009148861 | A2 | | 12/2009 | |
|----|---------------|-----|---|---------|---|
| WO | WO-2010093703 | A1 | | 8/2010 | |
| WO | WO-2011028254 | A2 | | 3/2011 | |
| WO | WO-2011050291 | A2 | | 4/2011 | |
| WO | WO-2012078634 | A2 | | 6/2012 | |
| WO | WO-2012138281 | A1 | | 10/2012 | |
| WO | WO-2013090209 | A1 | | 6/2013 | |
| WO | WO-2013163107 | A1 | | 10/2013 | |
| WO | WO-2014201287 | A1 | | 12/2014 | |
| WO | WO-2014205014 | A1 | * | 12/2014 | ............ G02F 1/153 |
| WO | WO-2015103433 | A1 | | 7/2015 | |
| WO | WO-2016004373 | A1 | | 1/2016 | |
| WO | WO-2016105549 | A2 | | 6/2016 | |

OTHER PUBLICATIONS

AU Examination report No. 1 for Standard patent application, dated Jul. 13, 2020, for Australian Patent Application No. 2015371272.
AU Notice of Acceptance for patent application, dated Oct. 6, 2020, for Australian Patent Application No. 2015371272.
AU Office Action dated Dec. 15, 2021, in Application No. AU20200250303.
CA Notice of Allowance dated Jun. 22, 2021 in CA Application No. 2,859,023.
CA Office Action dated Apr. 7, 2022 in CA Application No. CA2859023.
CA Office Action dated Dec. 15, 2021, in Application No. CA2972240.
CA Office Action dated Dec. 4, 2020 in CA Application No. 2,859,023.
CA Office Action dated Jan. 13, 2020 in CA Application No. 2,859,023.
CN Notice of Allowance with Search Report dated May 27, 2021 in CN Application No. 201580039994.0, with English Translation.
CN Office Action dated Dec. 24, 2020 in CN Application No. 201580039994.0, with English Translation.
CN Office Action dated Feb. 2, 2019 in CN Application No. 201280061260.9.
CN Office Action dated Feb. 3, 2020 in CN Application No. 201580039994.0.
CN Office Action dated Feb. 3, 2021 in CN Application No. 201580074719.2.
CN Office Action dated Feb. 4, 2017 in CN Application No. 201280061260.9.
CN Office Action dated Mar. 16, 2020 in CN Application No. 201580074719.2.
CN Office Action dated Mar. 21, 2016 in CN Application No. 201280061260.9.
CN Office Action dated May 6, 2020 in CN Application No. 201280061260.9, with English Translation.
CN Office Action dated Oct. 14, 2019 in CN Application No. 201480073448.4.
CN Office Action dated Oct. 16, 2017 in CN Application No. 201280061260.9.
CN Office Action (Decision of Rejection) dated May 15, 2018 in CN Application No. 201280061260.9.
CN Reexamination Decision dated Mar. 25, 2021 in CN Application No. 201280061260.9, No Translation.
CN Rejection Decision dated Dec. 1, 2020 in CN Application No. 201280061260.9, with English Translation.
CN Rejection Decision dated Jun. 28, 2021 in CN Application No. 201580074719.2.
Decision to Grant dated Apr. 22, 2021 for EP Application No. 17197774.7.
Decision to Grant dated Jun. 11, 2021 for EP Application No. 19150851.4.
EP Office Action dated Apr. 11, 2022, in Application No. EP15814398.2.
EP office action dated Nov. 25, 2021, in application No. EP19150841.4.
EP Search Report dated Apr. 7, 2022, in Application No. EP21204163.6.
EP search report mailed on Sep. 14, 2021, in application No. EP21173523.8.
European Office Action, dated Feb. 18, 2020, for EP Application No. 15814398.2.
European Office Action dated Jul. 28, 2016 for EP Application No. 12857376.3.
European Office Action dated Jun. 29, 2020 for EP Application No. 19150851.4.
European Search Report dated Apr. 24, 2018 for EP Application No. 17197774.7.
European Search Report dated Jan. 17, 2019 for EP Application No. 15873818.7.
European Search Report dated Jan. 30, 2018 for EP Application No. 15814398.2.
European Search Report dated Jul. 10, 2015 for EP Application No. 12857376.3.
European Search Report dated Mar. 28, 2019 for EP Application No. 17197774.7.
European Search Report dated Mar. 29, 2019 for EP Application No. 19150851.4.
IN Office Action dated Feb. 22, 2022, in Application No. IN201938042428.
International Preliminary Report on Patentability dated Jan. 12, 2017, in PCT/US2015/039089.
International Preliminary Report on Patentability dated Jun. 26, 2014 in PCT/US2012/068817.
International Preliminary Report on Patentability dated Jun. 27, 2017, in PCT/US2015/00411.
International Search Report and Written Opinion dated Jun. 29, 2016, in PCT/US2015/00411.
International Search Report and Written Opinion dated Mar. 29, 2013, in PCT/US2012/068817.
International Search Report and Written Opinion dated Oct. 30, 2015, in PCT/US2015/039089.
KR Notice of Decision to Grant, dated Jan. 30, 2020, in KR Application No. 2014-7018018.
KR Office Action dated May 19, 2022 in Application No. KR10-20207008593 with English translation.
KR Office Action dated Dec. 20, 2018 in KR Application No. 2014-7018018.
KR Office Action dated Jan. 26, 2022, in Application No. KR1020207008593 with English translation.
KR Office Action dated Oct. 30, 2019 in KR Application No. 2014-7018018.
KR Office Action, Notification of Provisional Rejection, dated Apr. 8, 2021 in KR Application No. 10-2020-7008593.
KR Office Action, Notification of Provisional Rejection, dated Jun. 22, 2020 in KR Application No. 10-2020-7008593.
Minutes of the Oral Proceedings dated Dec. 3, 2020 for EP Application No. 17197774.7.
Notice of Allowance dated Dec. 9, 2020 for EP Application No. 17197774.7.
Notice of Allowance dated May 17, 2021 for EP Application No. 15873818.7.
Preliminary Amendment filed Apr. 6, 2015 in U.S. Appl. No. 14/512,297.
Preliminary Amendment filed Aug. 31, 2015 in U.S. Appl. No. 14/822,732.
Preliminary Amendment filed Feb. 23, 2015 in U.S. Appl. No. 14/423,085.
Preliminary Amendment filed Jul. 28, 2014 in U.S. Appl. No. 14/325,290.
Preliminary Amendment filed Jul. 7, 2014 in U.S. Appl. No. 14/363,769.
Preliminary Amendment filed Oct. 21, 2014 in U.S. Appl. No. 14/363,769.
Response to Summons dated Oct. 23, 2020 for EP Application No. 17197774.7.
Results of the telephone consultation dated Dec. 1, 2020 for EP Application No. 17197774.7.

(56) References Cited

OTHER PUBLICATIONS

RU Notice of Allowance dated Jul. 19, 2017 in RU Application No. 2014128536.
RU Office Action dated Apr. 14, 2017 in RU Application No. 2014128536.
Singapore Exam Report and Grant Notice dated Mar. 5, 2018 for SG Application No. 10201608917Q.
Singapore Search Report and Written Opinion dated Apr. 19, 2017 for SG Application No. 10201608917Q.
Summons to attend oral proceedings dated May 12, 2020 for EP Application No. 17197774.7.
Taiwanese Notice of Allowance dated May 28, 2021 for TW Application No. 109106926 with English Translation.
Taiwanese Office Action dated Jan. 31, 2019 for TW Application No. 104121575.
Taiwanese Office Action dated Nov. 12, 2020 for TW Application No. 109106926 with English Translation.
TW Office Action dated Aug. 31, 2018 in TW Application No. 106146406.
TW Office Action dated Feb. 15, 2017 in TW Application No. 101146775.
TW Office Action dated Jun. 20, 2018 in TW Application No. 106119450.
TW Office Action dated May 10, 2021 in TW Application No. 108117698.
TW Office Action dated Oct. 20, 2016 in TW Application No. 101146775.
US Corrected Notice of Allowability dated Apr. 24, 2020 in U.S. Appl. No. 15/539,650.
U.S. Corrected Notice of Allowance dated Jun. 2, 2022 in U.S. Appl. No. 17/456,165.
U.S. Corrected Notice of Allowance dated Mar. 30, 2022, in U.S. Appl. No. 17/456,165.
US Final Office Action dated Aug. 22, 2019 in U.S. Appl. No. 15/491,869.
US Final Office Action dated Oct. 16, 2017 in U.S. Appl. No. 15/364,162.
US Notice of Allowance (corrected) dated May 19, 2016 in U.S. Appl. No. 14/362,863.
US Notice of Allowance dated Apr. 26, 2019 for U.S. Appl. No. 15/934,854.
U.S. Notice of Allowance dated Feb. 24, 2022, in U.S. Appl. No. 17/456,165.
US Notice of Allowance dated Feb. 6, 2018 in U.S. Appl. No. 15/364,162.
US Notice of Allowance dated Jan. 2, 2019 in U.S. Appl. No. 15/390,421.
US Notice of Allowance dated Jan. 23, 2020 in U.S. Appl. No. 15/539,650.
US Notice of Allowance dated Jan. 4, 2019 for U.S. Appl. No. 15/934,854.
US Notice of Allowance dated Jun. 26, 2018 in U.S. Appl. No. 14/822,732.
US Notice of Allowance dated Mar. 12, 2021 for U.S. Appl. No. 16/523,852.
US Notice of Allowance dated May 12, 2017 for U.S. Appl. No. 14/512,297.
US Notice of Allowance dated May 14, 2020 in U.S. Appl. No. 15/491,869.
US Notice of Allowance dated May 15, 2020 in U.S. Appl. No. 15/539,650.
US Notice of Allowance dated May 23, 2018 in U.S. Appl. No. 15/390,421.
US Notice of Allowance dated May 6, 2016 in U.S. Appl. No. 14/362,863.
US Notice of Allowance dated Nov. 23, 2020 in U.S. Appl. No. 16/195,693.
US Notice of Allowance dated Oct. 4, 2016 for U.S. Appl. No. 14/512,297.

US Notice of Allowance dated Sep. 19, 2018 in U.S. Appl. No. 15/390,421.
US Notice of Allowance dated Sep. 23, 2019 for U.S. Appl. No. 14/884,683.
US Office Action dated Apr. 2, 2020 for U.S. Appl. No. 16/523,852.
US Office Action dated Aug. 1, 2018 for U.S. Appl. No. 15/934,854.
US Office Action dated Feb. 15, 2019 in U.S. Appl. No. 15/491,869.
US Office Action dated Jan. 10, 2020 in U.S. Appl. No. 15/491,869.
US Office Action dated Jan. 29, 2016 in U.S. Appl. No. 14/362,863.
US Office Action dated Jun. 29, 2018 in U.S. Appl. No. 15/491,869.
US Office Action dated Mar. 28, 2017 for U.S. Appl. No. 15/364,162.
US Office Action dated May 10, 2016 for U.S. Appl. No. 14/512,297.
US Office Action dated May 15, 2019 for U.S. Appl. No. 14/884,683.
US Office Action dated Oct. 15, 2015 for U.S. Appl. No. 14/512,297.
US Office Action dated Oct. 25, 2019 for U.S. Appl. No. 16/523,852.
US Office Action dated Oct. 31, 2018 for U.S. Appl. No. 14/884,683.
US Office Action dated Sep. 12, 2017 in U.S. Appl. No. 14/822,732.
US Office Action dated Sep. 16, 2020 for U.S. Appl. No. 16/523,852.
U.S. Appl. No. 15/364,162, inventors Parker et al., filed Nov. 29, 2016.
U.S. Appl. No. 15/390,421, inventors Dixit et al., filed Dec. 23, 2016.
U.S. Appl. No. 15/491,869 , inventors Strong et al., filed Apr. 19, 2017.
U.S. Appl. No. 15/539,650, inventors Dixit et al., filed Jun. 23, 2017.
U.S. Appl. No. 15/934,854, inventors Parker et al., filed Mar. 23, 2018.
U.S. Appl. No. 16/195,693, inventors Dixit et al., filed Nov. 19, 2018.
U.S. Appl. No. 16/523,852, inventors Parker et al., filed Jul. 26, 2019.
U.S. Appl. No. 13/312,057, filed Dec. 6, 2011, entitled "Spacers for Insulated Glass Units".
U.S. Appl. No. 13/326,168, filed Dec. 14, 2011, entitled "Connectors for Smart Windows".
U.S. Appl. No. 13/452,032, filed Apr. 20, 2012, entitled "Angled Bus Bar".
U.S. Appl. No. 13/456,056, filed Apr. 25, 2012, entitled "Electrochromic Window Fabrication Methods".
U.S. Appl. No. 13/968,258, filed Aug. 15, 2013, entitled "Multi-purpose Controller for Multistate Windows".
U.S. Appl. No. 14/103,660, filed Dec. 11, 2013, entitled "Connectors for Smart".
U.S. Appl. No. 14/152,873, filed Jan. 10, 2014, entitled "Spacers for Insulated Glass Units".
U.S. Appl. No. 14/196,895, filed Mar. 4, 2014, entitled "Improved Spacers and Connectors for Insulated Glass Units".
U.S. Appl. No. 14/325,290, filed Jan. 7, 2015.
U.S. Appl. No. 14/325,290, filed Jul. 7, 2014, entitled "Connectors for Smart Windows".
U.S. Appl. No. 14/363,769, filed Jun. 6, 2014, entitled "Connectors for Smart Windows"—371 national phase application.
U.S. Appl. No. 14/512,297, filed Oct. 10, 2014, entitled "Electrochromic Window Fabrication Methods", and prelim amendment filed Oct. 10, 2014.
U.S. Appl. No. 14/822,732, filed Aug. 10, 2015, entitled "Thin-Film Devices and Fabrication".
U.S. Appl. No. 14/884,683, filed Oct. 15, 2015, entitled "Fabrication of Low Defectivity Electrochromic Devices".
U.S. Appl. No. 17/658,825, filed Apr. 12, 2022.
US Preliminary Amendment dated Sep. 17, 2019 for U.S. Appl. No. 16/523,852.
US Preliminary Amendment filed Aug. 26, 2020 in U.S. Appl. No. 16/947,834.
US Preliminary Amendment filed Aug. 31, 2020 in U.S. Appl. No. 16/947,841.
US Preliminary Amendment filed Nov. 20, 2018 in U.S. Appl. No. 16/195,693.
US Preliminary Amendment filed Jan. 12, 2017 for U.S. Appl. No. 15/364,162.
US Preliminary Amendment filed Apr. 17, 2018 in U.S. Appl. No. 15/934,854.

(56)          References Cited

OTHER PUBLICATIONS

US Preliminary Amendment filed Apr. 20, 2017 for U.S. Appl. No. 15/491,869.
US Preliminary Amendment filed Aug. 17, 2015 in U.S. Appl. No. 14/362,863.
U.S. Preliminary Amendment filed on Apr. 12, 2022 for U.S. Appl. No. 17/658,825.
US Preliminary Amendment filed Sep. 12, 2014 in U.S. Appl. No. 14/362,863.
U.S. Restriction Requirement dated Apr. 15, 2022 in U.S. Appl. No. 17/304,741.

\* cited by examiner

Section Z-Z' of device 440

Section W-W' of device 440

600

610 — Remove first width of material from second conductive layer and electrochromic stack to a depth sufficient to expose a portion of the first conductive layer 620 — Remove a second width of material to a second depth sufficient to remove the first conductive layer 630 — Apply a bus bar to the exposed portion of the first conductive layer

LASER METHODS FOR PROCESSING ELECTROCHROMIC GLASS

INCORPORATION BY REFERENCE

A PCT Request Form is filed concurrently with this specification as part of the present application. Each application that the present application claims benefit of or priority to as identified in the concurrently filed PCT Request Form is incorporated by reference herein in its entirety and for all purposes.

TECHNICAL FIELD

Embodiments disclosed herein relate generally to optical devices, and more particularly to methods of fabricating optical devices.

BACKGROUND

Electrochromism is a phenomenon in which a material exhibits a reversible electrochemically-mediated change in an optical property when placed in a different electronic state, typically by being subjected to a voltage change. The optical property is typically one or more of color, transmittance, absorbance, and reflectance. For example, one well known electrochromic material is tungsten oxide ($WO_3$). Tungsten oxide is a cathodically coloring electrochromic material in which a coloration transition, bleached (non-colored) to blue, occurs by electrochemical reduction. When electrochemical oxidation takes place, tungsten oxide transitions from blue to a bleached state.

Electrochromic materials may be incorporated into, for example, windows for home, commercial and other uses. The color, transmittance, absorbance, and/or reflectance of such windows may be changed by inducing a change in the electrochromic material, that is, electrochromic windows are windows that can be darkened and lightened reversibly via application of an electric charge. A small voltage applied to an electrochromic device of the window will cause it to darken; reversing the voltage causes it to lighten. This capability allows control of the amount of light that passes through the windows and presents an opportunity for electrochromic windows to be used as energy-saving devices.

Improved fabrication techniques of electrochromic devices for electrochromic devices, and/or other thin-film devices where one or more layers are sandwiched between two thin-film conductive layers are desirable. In addition to electrochromic devices, flat panel displays, photovoltaic devices, suspended particle devices (SPD's), liquid crystal devices (LCD's) may benefit from the techniques described hereinbelow.

SUMMARY

Certain embodiments of this disclosure pertain to methods of removing a material from a surface of a workpiece. The workpiece may be any structure having a material that can be fully or partially removed or otherwise modified by one or more lasers. In some embodiments, the workpiece is a window or other structure comprising an optically switchable device. In certain embodiments, the workpiece is an electrochromic device or a partially fabricated electrochromic device on a transparent substrate. The electrochromic device comprises one or more layers such as an electrochromic stack between two transparent conductive layers. The transparent conductive layers are electrically isolated from one another and independently addressable. They may be electrically controllable by bus bars or other attached electrically conductive structure.

The methods of removing the material may be characterized by the following operations: (a) directing a laser beam onto a first position on the surface of the workpiece, where the laser beam removes the material from the first position on the surface of the workpiece; (b) moving the laser beam to a second position on the surface of the workpiece and removing the material from the second position on the surface of the workpiece; and (c) moving the laser beam to one or more additional positions on the surface of the workpiece and removing the material from the one or more additional positions on the surface of the workpiece. The material may be removed by laser ablation.

In certain embodiments, the laser beam is substantially collimated. As used herein, a substantially collimated laser beam has an angular divergence of about 1 milliradian or less.

In certain embodiments, the laser beam comprises pulses of electromagnetic radiation having an energy density from about 1 $J/cm^2$ to about 10 $J/cm^2$ in a spot having a characteristic dimension of at least about 5 mm at the surface of the workpiece. As used herein, the "characteristic dimension" of the laser spot may be the greatest distance between any two points on the spot. In the case of a generally circular or elliptical spot, the characteristic dimension may be a diameter. In the cases of a polygonal spot, the characteristic dimension may be the distance between two vertices. The boundary of the spot may be the location where intensity of the laser beam radiation drops to about 20% of its maximum. In certain embodiments, the spot produced by the pulses of electromagnetic radiation has a substantially square or rectangular shape.

In some implementations, the material includes some or all layers of an electrochromic device, and removing the material produces an edge on the one or more layers. In some embodiments, the edge has a tapered profile. In some cases, the tapered profile has a taper width of at least about 70 micrometers. In some embodiments, the region of the material removal is a bus bar pad expose region adjacent to the edge with a tapered profile.

In certain embodiments, removing material from the first position, the second position, and/or the one or more additional positions on the surface of the workpiece comprises removing at least a portion of one or more layers of an electrochromic device. Such layers may include a first transparent conductive layer, an electrochromic stack, and/or a second transparent conductive layer.

In some implementations, removing material from the first position, the second position, and/or the one or more additional positions on the surface of the workpiece produces an edge delete region disposed on at least a portion of a perimeter of the workpiece. The edge delete region may comprise an exposed portion of the surface of the workpiece.

In some implementations, removing material from the first position, the second position, and/or the one or more additional positions on the surface of the workpiece produces a bus bar pad expose region. The bus bar pad expose region may comprise an exposed portion of the surface of a transparent conductive layer.

In certain embodiments, removing material from the first position, the second position, and/or the one or more additional positions on the surface of the workpiece produces a region of material removal having a width of at least about 5 mm.

In some implementations, the method may be characterized by the absence of certain requirements of some conventional processes. For example, in certain embodiments, removing the material from the first position, the second position, and/or the one or more additional positions on the surface of the workpiece does not comprise moving the laser beam in a raster scan. Further, in certain embodiments, the laser beam is not focused on the surface of the workpiece.

In certain embodiments, the pulses of electromagnetic radiation comprise radiation of at least two wavelengths. In such embodiments, the method may control proportions of the laser beam provided in a first wavelength and in a second wavelength. In some cases, the pulses of electromagnetic radiation comprise radiation of a first wavelength in the visible range and radiation of a second wavelength in the infrared range. As an example, the first wavelength is in a range of about 400 nm to 600 nm, and the second wavelength is in a range of about 900 nm to 1200 nm.

In certain embodiments, the laser beam is produced by a neodymium YAG laser.

In certain embodiments, the pulses of electromagnetic radiation have pulse energies of from about 300 mJ to 1500 mJ. In certain embodiments, the pulses of electromagnetic radiation have pulse durations of from about 1 ns to 100 ns. In certain embodiments, the pulses of electromagnetic radiation have a pulse repetition rate of about 1 to 1000 Hz. In certain embodiments, the pulses of electromagnetic radiation have a pulse repetition rate of about 50 to 300 Hz.

In certain embodiments, at least a portion of the pulses of electromagnetic radiation has a substantially Gaussian energy distribution in the spot at the first distance from the laser. The energy distribution may be provided in any of various transverse EM modes.

In some implementations, moving the laser beam to the second position and the one or more additional positions takes place at a velocity of about 200 mm/s to 1500 mm/s.

Certain embodiments of this disclosure pertain to a material removal system that may be characterized by the following elements: (a) a laser configured to produce a laser beam comprising pulses of electromagnetic radiation having an energy density from about 1 J/cm$^2$ to 10 J/cm$^2$ in a spot having a characteristic dimension of at least about 5 mm at a first distance from the laser; and (b) a workpiece holder configured to hold a surface of a workpiece at the first distance from the laser. In such embodiments, the material removal system may be configured to provide the laser beam in a substantially collimated shape at the first distance from the laser. In some implementations, the laser and the workpiece holder are configured such that, during operation, the laser beam ablates a material from the surface of the workpiece. In certain embodiments, the material comprises one or more layers of an electrochromic device. In certain embodiments, the one or more layers of an electrochromic device comprises all the layers of the electrochromic device. In certain embodiments, the one or more layers of an electrochromic device comprises all the layers of the electrochromic device except a transparent conductor layer proximate the workpiece.

In certain embodiments, the laser is a neodymium YAG laser.

In certain embodiments, the system is configured such that the laser beam has a transverse area of at least about 20 mm2 at the first distance from the laser.

In certain embodiments, the laser is configured to produce the pulses of electromagnetic radiation with pulse energies of from about 300 mJ to 1500 mJ. In certain embodiments, the laser is configured to produce the pulses of electromagnetic radiation with pulse durations of from about 1 ns to 100 ns. In certain embodiments, the laser is configured to produce the pulses of electromagnetic radiation with a pulse repetition rate of about 1 to 1000 Hz. In certain embodiments, the laser is configured to produce the pulses of electromagnetic radiation with a pulse repetition rate of about 50 to 300 Hz. In certain embodiments, the laser is configured to produce the pulses of electromagnetic radiation with at least a portion having a substantially Gaussian energy distribution in the spot at the first distance from the laser.

In some implementations, the system may be characterized by the absence of certain elements of some conventional processes. For example, in certain embodiments, the system does not include a component for inducing the laser beam move in a raster scan. In certain embodiments, the system does not include an autofocus system for maintaining a focal position of the laser beam at a position where, during operation, material is to be removed from the workpiece. In certain embodiments, the system does not include an optical element configured to focus the laser beam onto a position where, during operation, material is to be removed from the workpiece.

In some implementations, the laser is configured to produce the laser beam with at least two wavelengths. In some cases, the system includes a component configured to control the proportions of the laser beam provided in first wavelength and in a second wavelength. In some implementations, the laser is configured to produce the laser beam with radiation of a first wavelength in the visible range and with a second wavelength in the infrared range. For example, the first wavelength is in a range of about 400 nm to 600 nm, and the second wavelength is in a range of about 900 nm to 1200 nm.

In some implementations, the system additionally includes a beam collimator configured to change a characteristic dimension of the laser beam. In some implementations, the system additionally includes a beam shaper configured to change a beam profile distribution of the laser beam.

Some aspects of the disclosure pertain to structures that may be characterized by the following elements: (a) a substrate; (b) an electrochromic device disposed on the substrate, where the electrochromic device comprises an electrochromic stack between a first transparent conductive layer and a second transparent conductive layer, and where the first transparent conductive layer is disposed between the electrochromic stack and the substrate; and (c) a region of material removal where at least a portion of the electrochromic device is removed from the substrate. The region of material removal may comprise a laser beam pulse imprint having a characteristic dimension of at least about 5 mm.

In certain embodiments, the region of material removal comprises a laser beam path imprint that does not follow a raster pattern. In certain embodiments, the laser beam pulse imprint has a substantially square or rectangular shape.

In certain embodiments, the region of material removal comprises an edge delete region disposed on at least a portion of a perimeter of the substrate. In certain embodiments, the edge delete region comprises a surface of the substrate that is uncovered. In certain embodiments, the region of material removal comprises a bus bar pad expose region. The bus bar pad expose region may comprise a region of the first transparent conductive layer that is uncovered.

In some cases, the region of material removal is at least partially bounded by an edge with a portion of the electrochromic device outside the region of material removal, and the edge has a tapered profile. In certain embodiments, the tapered profile has a taper width of at least about 70 um between a top of the edge and a bottom of the edge that abuts the region of material removal. In some implementations, the region of material removal is a bus bar pad expose region. In some implementations, the electrochromic device does not have a scribe line through the second transparent conductive layer that would electrically isolate a portion of the second transparent conductive layer along the bus bar pad expose region.

In certain embodiments, the region of material removal is on or in the first conductive layer, the electrochromic stack, or the second transparent conductive layer. In certain embodiments, the region of material removal has a width of at least about 5 mm. In some cases, the region of material removal has a width of at least about 8 mm.

Another aspect of this disclosure pertains to devices characterized by the following elements: (a) a substrate; (b) an electrochromic device disposed on the substrate, wherein the electrochromic device comprises an electrochromic stack between a first transparent conductive layer and a second transparent conductive layer, wherein the first transparent conductive layer is disposed between the electrochromic stack and the substrate; and (c) a bus bar expose (BPE) region disposed on or in the first transparent conductive layer. The BPE may comprise a region of the first transparent conductive layer that is not covered by the electrochromic stack or the second conductive layer. In various embodiments, the device does not have a scribe line through the second transparent conductive layer, which scribe line would electrically isolate a portion of the second transparent conductive layer along the bus bar pad expose region.

In some implementations, the BPE region has a width of at least about 5 mm. In some implementations, the BPE region is at least partially bounded by an edge with a portion of the electrochromic device outside the BPE region, and the edge may have a tapered profile. In some cases, the tapered profile has a taper width of at least about 70 um between a top of the edge and a bottom of the edge that abuts one of the transparent conductive layers, a material layer between the transparent conductive layer and the substrate, and the substrate.

In certain embodiments, the BPE region comprises a laser beam pulse imprint on or in the first transparent conductive layer, wherein the laser beam pulse imprint has a characteristic dimension of at least about 5 mm. In some cases, the laser beam pulse imprint has a substantially square or rectangular shape.

In certain embodiments, the BPE region comprises a laser beam path imprint that does not follow a raster pattern. In certain embodiments, the device additionally comprises an edge delete region disposed on at least a portion of a perimeter of the substrate.

Another aspect of the disclosure pertains to methods of removing a material from a surface of a workpiece, where the methods are characterized by the following operations: (a) directing a laser beam onto a first position on the surface of the workpiece, where the laser beam comprises pulses of electromagnetic radiation having at least two wavelengths, and where the pulses of electromagnetic radiation form a spot that removes the material from the first position on the surface of the workpiece; (b) moving the laser beam to a second position on the surface of the workpiece and removing the material from the second position on the surface of the workpiece; and (c) moving the laser beam to one or more additional positions on the surface of the workpiece and removing the material from the one or more additional positions on the surface of the workpiece.

In some cases, the laser beam is produced by a neodymium YAG laser. In certain embodiments, the laser beam is substantially collimated. In certain embodiments, the laser beam has a characteristic dimension of at least about 5 mm at the surface of the workpiece. In certain embodiments, the pulses of electromagnetic radiation have an energy density from about 1 $J/cm^2$ to about 10 $J/cm^2$.

As examples, the pulses of electromagnetic radiation may comprise radiation of a first wavelength in the visible range and radiation of a second wavelength in the infrared range. For example, the first wavelength may be in a range of about 400 nm to 600 nm, and the second wavelength may be in a range of about 900 nm to 1200 nm. The methods may additionally include an operation of controlling proportions of the laser beam provided in a first wavelength and in a second wavelength.

Some aspects of the disclosure pertain to material removal systems that may be characterized by the following features: (a) a laser configured to produce a laser beam comprising pulses of electromagnetic radiation having at least two wavelengths in a spot having a characteristic dimension of at least about 5 mm at a first distance from the laser; and (b) a workpiece holder configured to hold a surface of a workpiece at the first distance from the laser. In certain embodiments, the material removal system is configured to provide the laser beam in a substantially collimated shape at the first distance from the laser. In certain embodiments, the pulses of electromagnetic radiation have an energy density from about 1 $J/cm^2$ to about 10 $J/cm^2$.

In some cases, a system additionally includes a component configured to control the proportions of the laser beam provided in first wavelength and in a second wavelength. In certain embodiments, the laser is configured to produce the laser beam with radiation of a first wavelength in the visible range and with a second wavelength in the infrared range. As an example, the first wavelength may be in a range of about 400 nm to 600 nm, and the second wavelength may be in a range of about 900 nm to 1200 nm. In certain embodiments, the laser is a neodymium YAG laser.

In some implementations, the system additionally includes a beam collimator configured to change a characteristic dimension of the laser beam. In some implementations, the system additionally includes a beam shaper configured to change a beam profile distribution of the laser beam.

BRIEF DESCRIPTION OF THE DRAWINGS

The following detailed description can be more fully understood when considered in conjunction with the drawings in which.

DETAILED DESCRIPTION

Figures 1A, 1B:
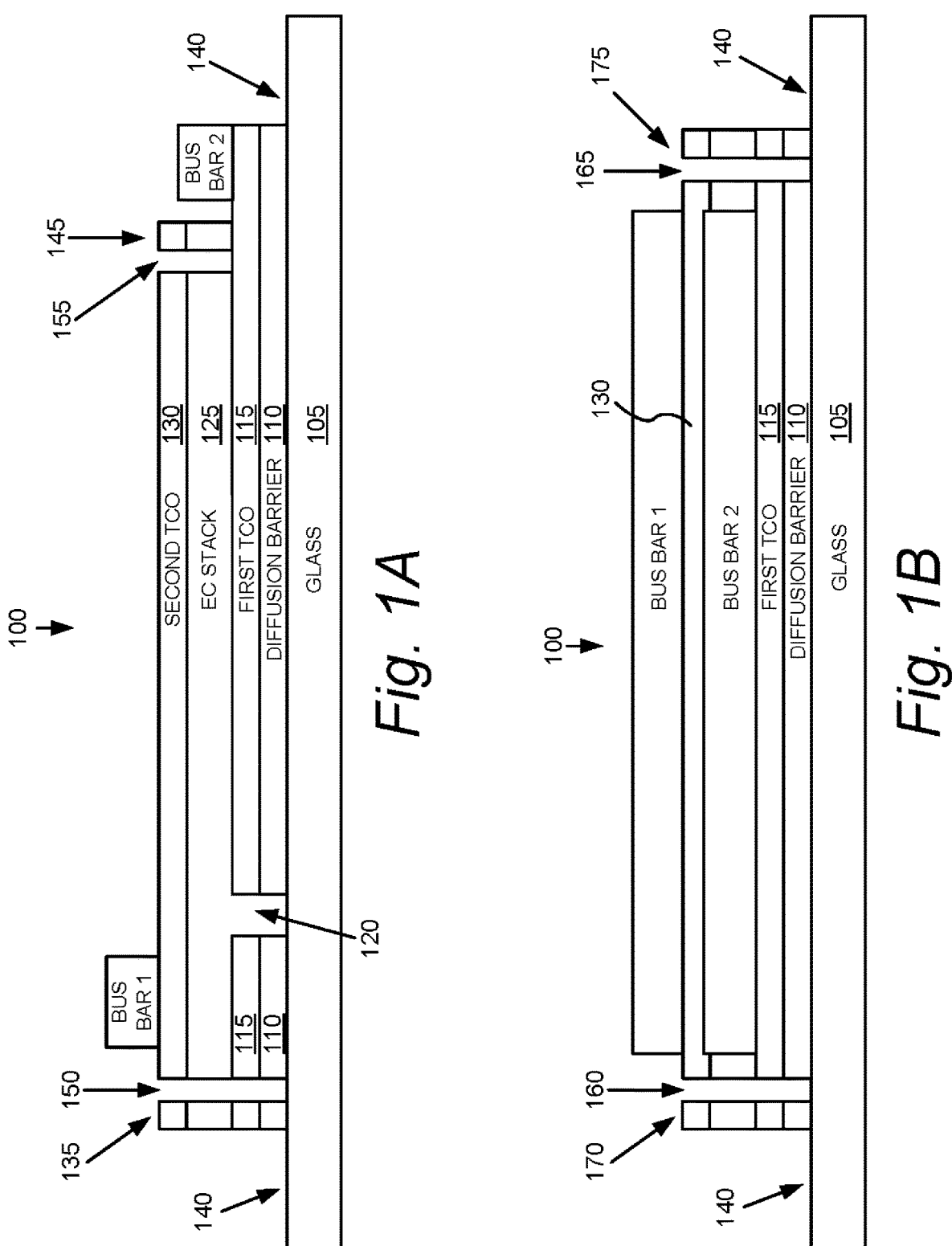
FIGS. 1A, 1B, and 1C are cross-section, end view, and top view drawings respectively of an electrochromic device fabricated on a glass substrate.

Details of one or more implementations of the subject matter described in this specification are set forth in this disclosure, which includes the description and claims in this document and the accompanying drawings.

Certain embodiments are directed to optical devices, that is, thin-film devices having at least one transparent conductor layer. In the simplest form, an optical device includes a substrate and one or more material layers sandwiched between two conductor layers, one of which is transparent. In one embodiment, an optical device includes a transparent substrate and two transparent conductor layers. In another embodiment, an optical device includes a transparent substrate upon which is deposited a transparent conductor layer (the lower conductor layer) and the other (upper) conductor layer is not transparent. In another embodiment, the substrate is not transparent, and one or both of the conductor layers is transparent. Some examples of optical devices include electrochromic devices, flat panel displays, photovoltaic devices, suspended particle devices (SPD's), liquid crystal devices (LCD's), and the like. For context, a description of electrochromic devices is presented below. For convenience, all solid-state and inorganic electrochromic devices are described; however, embodiments are not limited in this way. Particular focus is given to methods of patterning and fabricating optical devices. Various edge deletion and isolation scribes are performed, for example, to ensure the optical device has appropriate isolation from any edge defects, but also to address unwanted coloration and charge buildup in areas of the device. Edge treatments are applied to one or more layers of optical devices during fabrication. Methods described herein apply to any thin-film device having one or more material layers sandwiched between two thin-film electrical conductor layers.

For the purposes of brevity, embodiments are described in terms of electrochromic devices; however, the scope of the disclosure is not so limited. One of ordinary skill in the art would appreciate that methods described can be used to fabricate virtually any thin-film device where one or more layers are sandwiched between two thin-film conductor layers. Certain embodiments are directed to optical devices, that is, thin-film devices having at least one transparent conductor layer. In the simplest form, an optical device includes a substrate and one or more material layers sandwiched between two conductor layers, one of which is transparent. In one embodiment, an optical device includes a transparent substrate and two transparent conductor layers. In another embodiment, an optical device includes a transparent substrate upon which is deposited a transparent conductor layer (the lower conductor layer) and the other (upper) conductor layer is not transparent. In another embodiment, the substrate is not transparent, and one or both of the conductor layers is transparent. Some examples of optical devices include electrochromic devices, flat panel displays, photovoltaic devices, suspended particle devices (SPD's), liquid crystal devices (LCD's), and the like. For context, a description of electrochromic devices is presented below. For convenience, all solid-state and inorganic electrochromic devices are described, such as those contemplated by U.S. patent application Ser. No. 15/109,624, filed Oct. 12, 2016, entitled "Thin Film Devices and Fabrication", assigned to the assignee of the present invention, and hereby incorporated by reference in its entirety; however, embodiments are not limited in this way.

Figure 1C:
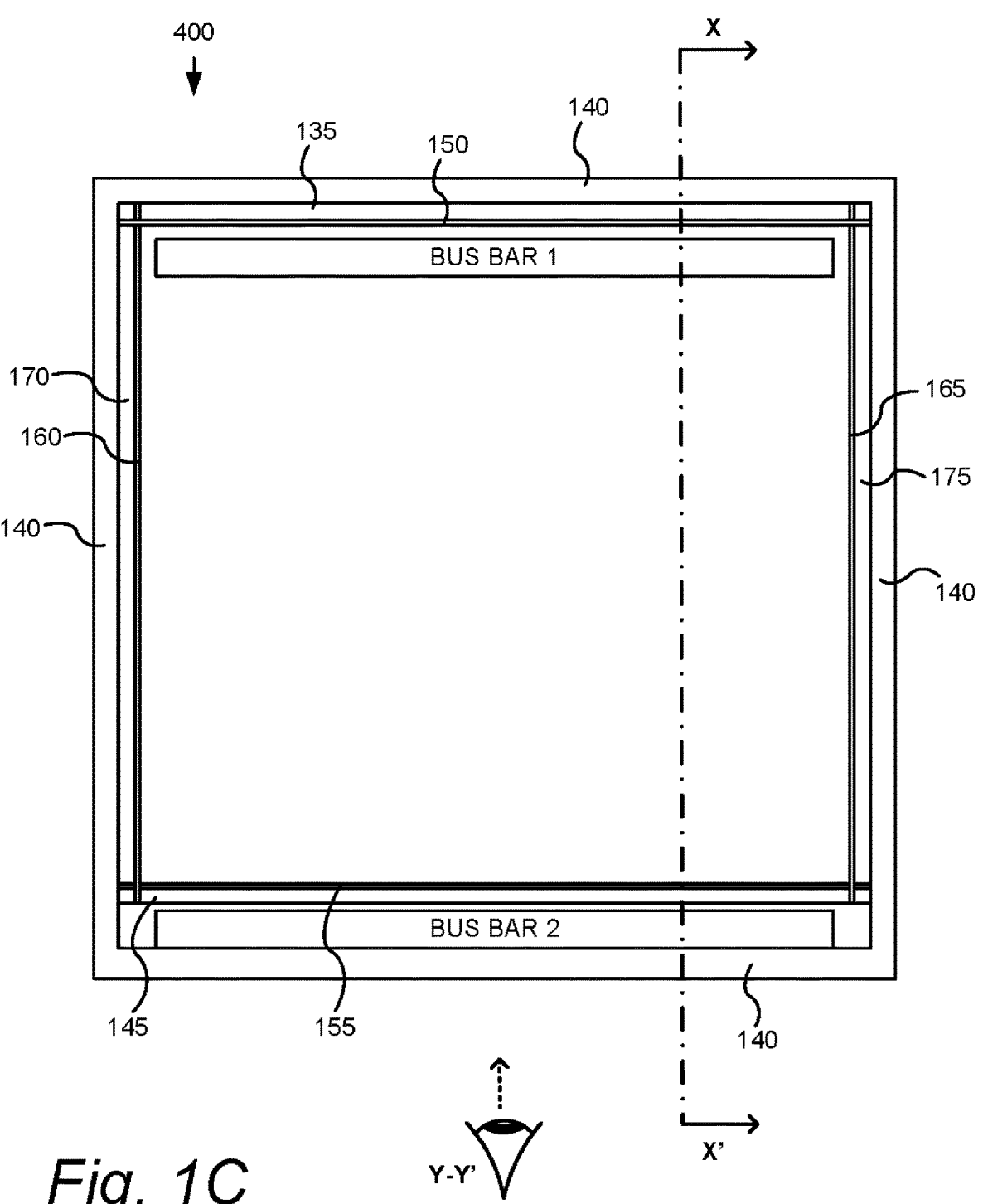

A particular example of an electrochromic (EC) lite is described with reference to FIGS. 1A-1C, in order to illustrate embodiments described herein. The electrochromic lite includes an electrochromic device fabricated on a substrate. FIG. 1A is a cross-sectional representation (see cut X-X' of FIG. 1C) of an electrochromic lite, 100, which is fabricated starting with a glass sheet, 105. FIG. 1B shows an end view (see perspective Y-Y' of FIG. 1C) of electrochromic lite 100, and FIG. 1C shows a top-down view of electrochromic lite 100.

FIG. 1A shows the electrochromic lite 100 after fabrication on glass sheet 105 and the edge has been deleted to produce area 140 around the perimeter of the lite. Edge deletion refers to removing one or more material layers from the device about some perimeter portion of the substrate. Typically, though not necessarily, edge deletion removes material down to and including the lower conductor layer (e.g., layer 115 in the example depicted in FIGS. 1A-1C), and may include removal of any diffusion barrier layer(s) down to the substrate itself. In FIGS. 1A-1B, the electrochromic lite 100 has also been laser scribed and bus bars have been attached. The glass lite, 105, has a diffusion barrier, 110, and a first transparent conducting oxide (TCO) 115 on the diffusion barrier.

In this example, a laser edge deletion ("LED") process removes both TCO 115 and diffusion barrier 110, but in other embodiments, only the TCO is removed, leaving the diffusion barrier intact. The TCO layer 115 is the first of two conductive layers used to form the electrodes of the electrochromic device fabricated on the glass sheet. In some examples, the glass sheet may be prefabricated with the diffusion barrier formed over underlying glass. Thus, the diffusion barrier is formed, and then the first TCO 115, an EC stack 125 (e.g., stack having electrochromic, ion conductor, and counter electrode layers), and a second TCO, 130, are formed. In other examples, the glass sheet may be prefabricated with both the diffusion barrier and the first TCO 115 formed over underlying glass.

In certain embodiments, one or more layers may be formed on a substrate (e.g., glass sheet) in an integrated deposition system where the substrate does not leave the integrated deposition system at any time during fabrication of the layer(s). In one embodiment, an electrochromic device including an EC stack and a second TCO may be fabricated in the integrated deposition system where the glass sheet does not leave the integrated deposition system at any time during fabrication of the layers. In one case, the first TCO layer may also be formed using the integrated deposition system where the glass sheet does not leave the integrated deposition system during deposition of the EC stack, and the TCO layer(s). In one embodiment, all of the layers (e.g., diffusion barrier, first TCO, EC stack, and second TCO) are deposited in the integrated deposition system where the glass sheet does not leave the integrated deposition system during deposition. In this example, prior to deposition of EC stack 125, an isolation trench, 120, may be cut through first TCO 115 and diffusion barrier 110. Trench 120 is made in contemplation of electrically isolating an area of first TCO 115 that will reside under bus bar 1 after fabrication is complete (see FIG. 1A). Trench 120 is sometimes referred to as the "L1" scribe, because it is the first laser scribe in certain processes. This may be done to avoid charge buildup and coloration of the EC device under the bus bar, which can be undesirable.

After formation of the EC device, LED processes and additional laser scribing may be performed. FIGS. 1A and 1B depict areas 140 where the EC device has been removed, in this example, from a perimeter region surrounding laser scribe trenches, 150, 155, 160 and 165. Laser scribes 150, 160 and 165 are sometimes referred to as "L2" scribes, because they are the second scribes in certain processes. Laser scribe 155 is sometimes referred to as the "L3" scribe, because it is the third scribe in certain processes. The L3 scribe passes through second TCO, 130, and in this example (but not necessarily) the EC stack 125, but not the first TCO 115. Laser scribe trenches 150, 155, 160, and 165 are made to isolate portions of the EC device, 135, 145, 170, and 175, which were potentially damaged during edge deletion processes from the operable EC device.

The laser or lasers used for the laser scribe processes are typically, but not necessarily, pulse-type lasers, for example, diode-pumped solid state lasers. For example, the laser scribe processes can be performed using a suitable laser. Some examples of suppliers that may provide suitable lasers include IPG Photonics Corp. (of Oxford, Massachusetts), Ekspla (of Vilnius, Lithuania), TRUMPF Inc. (Farmington, Connecticut), SPI Lasers LLC (Santa Clara, California), Spectra-Physics Corp. (Santa Clara, California), nLIGHT Inc. (Vancouver, Washington), and Fianium Inc. (Eugene, Oregon). Certain scribing steps can also be performed mechanically, for example, by a diamond tipped scribe; however, certain embodiments describe depth control during scribes or other material removal processing, which is well controlled with lasers. For example, in one embodiment, edge deletion is performed to the depth of the first TCO, in another embodiment edge deletion is performed to the depth of a diffusion barrier (the first TCO is removed), in yet another embodiment edge deletion is performed to the depth of the substrate (all material layers removed down to the substrate). In certain embodiments, variable depth scribes are described.

After laser scribing is complete, bus bars are attached. Non-penetrating bus bar (1) is applied to the second TCO. Non-penetrating bus bar (2) is applied to an area where the device including an EC stack and a second TCO was not deposited (for example, from a mask protecting the first TCO from device deposition) or, in this example, where an edge deletion process (e.g. laser ablation using an apparatus e.g. having a XY or XYZ galvanometer) was used to remove material down to the first TCO. In this example, both bus bar 1 and bus bar 2 are non-penetrating bus bars. A penetrating bus bar is one that is typically pressed into (or soldered) and through one or more layers to make contact with a lower conductor, e.g. TCO located at the bottom of or below one or more layers of the EC stack). A non-penetrating bus bar is one that does not penetrate into the layers, but rather makes electrical and physical contact on the surface of a conductive layer, for example, a TCO. A typical example of a non-penetrating bus bar is a conductive ink, e.g. a silver-based ink, applied to the appropriate conductive surface.

The TCO layers can be electrically connected using a non-traditional bus bar, for example, a bus bar fabricated with screen and lithography patterning methods. For example, electrical communication may be established with the device's transparent conducting layers via silk screening (or using another patterning method) a conductive ink followed by heat curing or sintering the ink. Advantages to using the above described device configuration include simpler manufacturing, for example, and less laser scribing than conventional techniques which use penetrating bus bars.

After the bus bars are fabricated or otherwise applied to one or more conductive layers, the electrochromic lite may be integrated into an insulated glass unit (IGU), which includes, for example, wiring for the bus bars and the like. In some embodiments, one or both of the bus bars are inside the finished IGU. In particular embodiments, both bus bars are configured between the spacer and the glass of the IGU (commonly referred to as the primary seal of the IGU); that is, the bus bars are registered with the spacer used to separate the lites of an IGU. Area 140 is used, at least in part, to make the seal with one face of the spacer used to form the IGU. Thus, the wires or other connection to the bus bars runs between the spacer and the glass. As many spacers are made of metal, e.g., stainless steel, which is conductive, it is desirable to take steps to avoid short circuiting due to electrical communication between the bus bar and connector thereto and the metal spacer. Particular methods and apparatus for achieving this end are described in U.S. patent application Ser. No. 13/312,057, filed Dec. 6, 2011, and titled "Improved Spacers for Insulated Glass Units," which is hereby incorporated by reference in its entirety. In certain embodiments described herein, methods and resulting IGUs include having each of the perimeter edge of the EC device, bus bars and any isolation scribes within the primary seal of the IGU.

Figure 2:
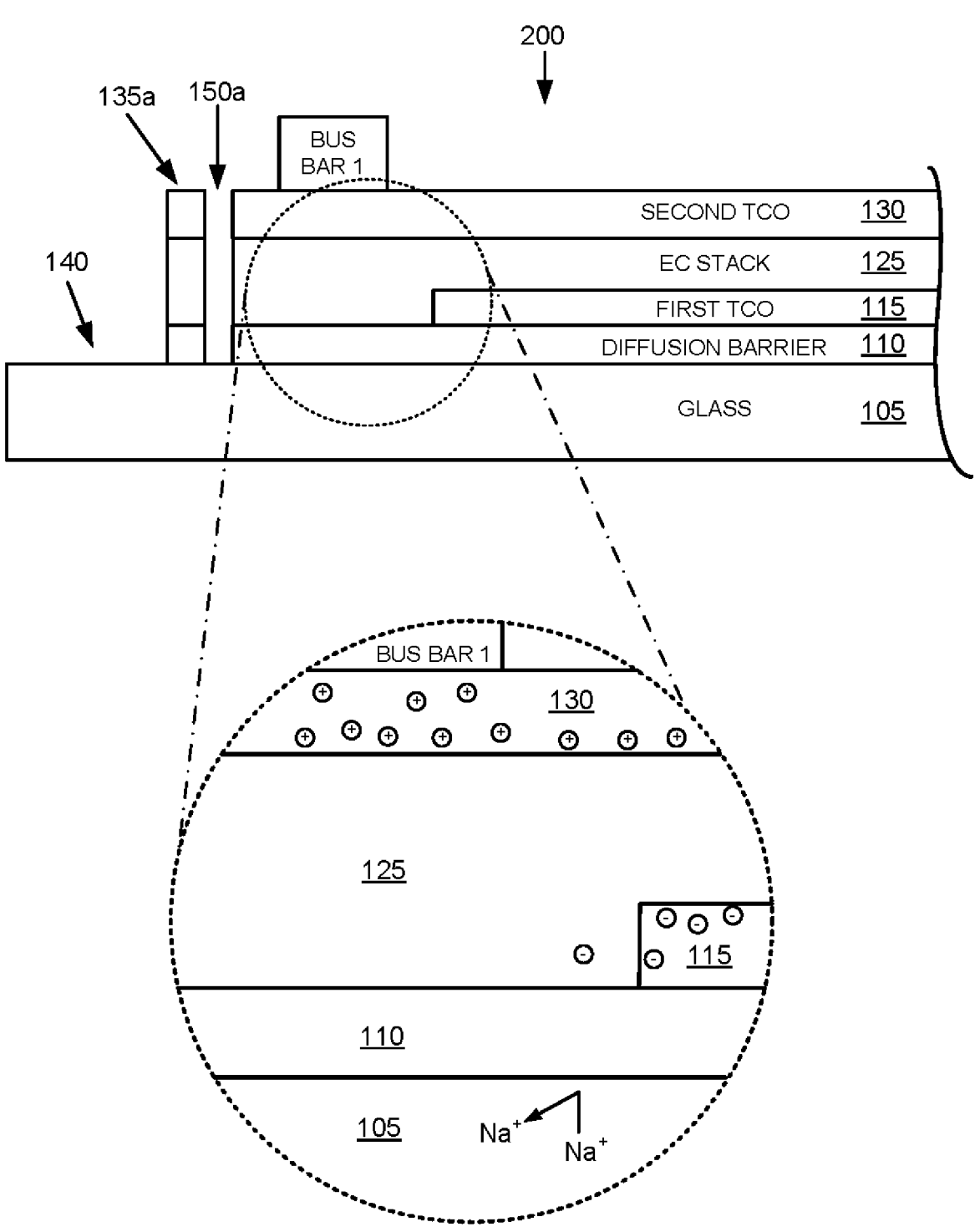
FIG. 2 is a partial cross-section of an electrochromic device architecture on a substrate.

FIG. 2 is a partial cross-section showing an EC device, 200 of a second configuration. In the illustrated example, the portion of first TCO 115 that would have extended below bus bar 1 is removed prior to fabrication of EC stack 125. In this example, diffusion barrier 110 extends to under bus bar 1 and to the edge of the EC device. In some examples, the diffusion barrier extends to the edge of glass 105, that is, it covers area 140. In other examples, a portion of the diffusion barrier may also be removed under the bus bar 1. In the aforementioned examples, the selective TCO removal under bus bar 1 is performed prior to fabrication of EC stack 125. Edge deletion processes to form areas 140 (e.g., around the perimeter of the glass where the spacer forms a seal with the glass) can be performed prior to device fabrication or after. An isolation scribe trench, 150a, may be formed if the edge delete process to form 140 creates a rough edge or otherwise unacceptable edge due to, e.g., shorting issues, thus isolating a portion, 135a, of material from the remainder of the EC device. As exemplified in the expanded portion of EC device 200 depicted in FIG. 2, since there is no portion of TCO 115 under bus bar 1, the aforementioned problems such as unwanted coloring and charge buildup may be avoided. Also, since diffusion barrier 110 is left intact, at least co-extensive with EC stack 125, sodium ions are prevented from diffusing into the EC stack 125 and causing unwanted conduction or other problems.

Figure 3:
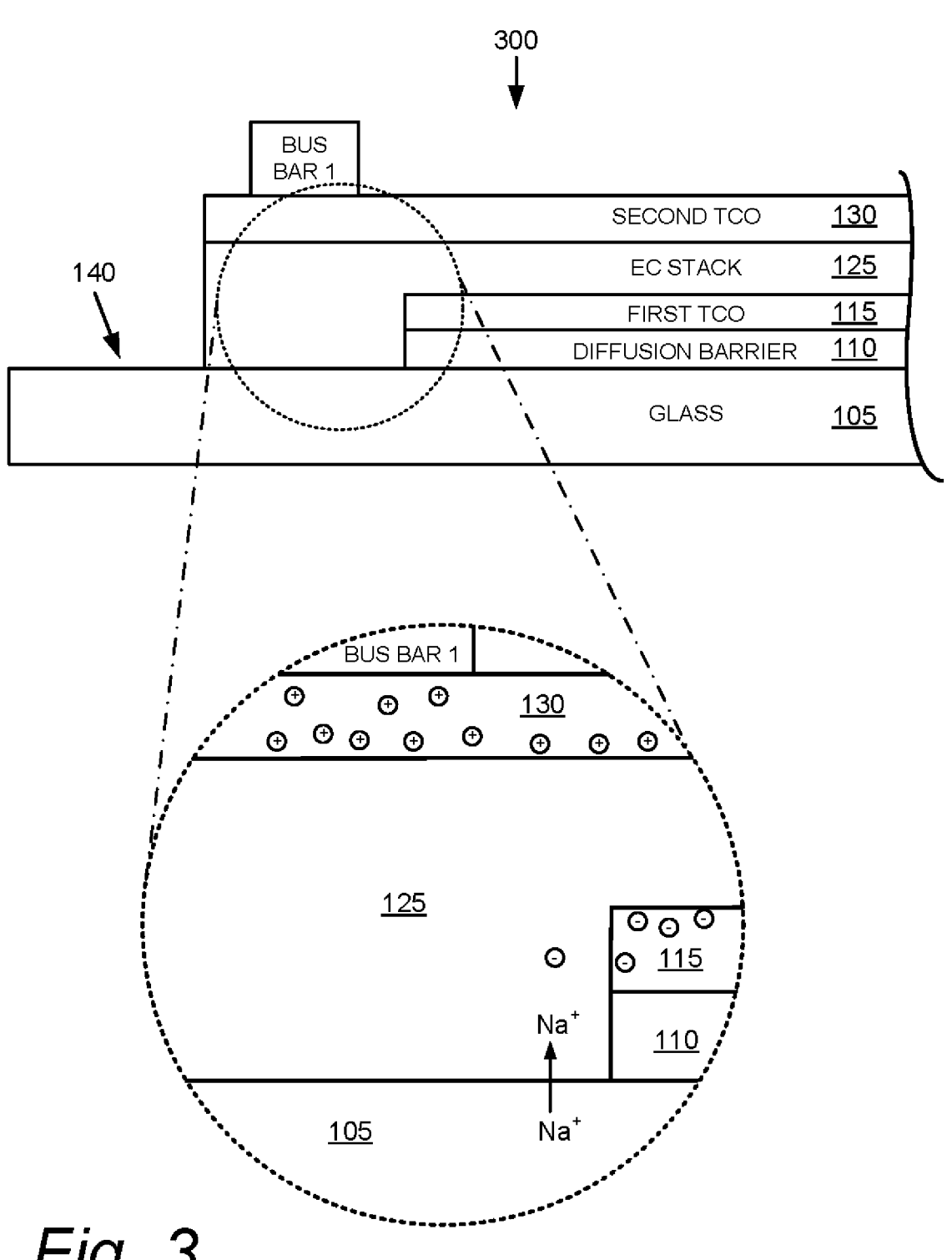
FIG. 3 is a partial cross-section showing device architecture where the diffusion barrier is removed along with the lower conducting layer.

FIG. 3 is a partial cross-section showing electrochromic device architecture, 300 of yet a further configuration. In the illustrated example, the portions of TCO 115 and diffusion barrier 110 that would have extended below bus bar 1 are removed prior to fabrication of EC stack 125. That is, the first TCO and diffusion barrier removal under bus bar 1 is performed prior to fabrication of EC stack 125. LED processes to form areas 140 (e.g., around the perimeter of the glass where the spacer forms a seal with the glass) can be performed prior to device fabrication (e.g., removing the diffusion barrier and using a mask thereafter) or after device fabrication (removing all materials down to the glass). An isolation scribe trench, analogous to 150a in FIG. 2, may be formed if the edge deletion process to form 140 creates a rough edge, thus isolating a portion, 135a (see FIG. 2), of material from the remainder of the EC device.

Techniques for fabricating an optical device including one or more material layers sandwiched between a first conducting layer (e.g., first TCO 115) and a second conducting layer (e.g., second TCO 130) may include: (i) receiving a substrate including the first conducting layer over its work surface; (ii) removing a first width of the first conducting layer from between about 10% and about 90% of the perimeter of the substrate; (iii) depositing the one or more material layers of the optical device and the second conducting layer such that they cover the first conducting layer and, where possible, extend beyond the first conducting layer about its perimeter; (iv) removing a second width, narrower than the first width, of all the layers about substantially the entire perimeter of the substrate, where the depth of removal is at least sufficient to remove the first conducting layer; (v) removing at least one portion of the second transparent conducting layer and the one or more layers of the optical device thereunder thereby revealing at least one exposed portion of the first conducting layer; and (vi) applying a bus bar to the at least one exposed portion of the first transparent conducting layer; where at least one of the first and second conducting layers is transparent.

Figure 4A:
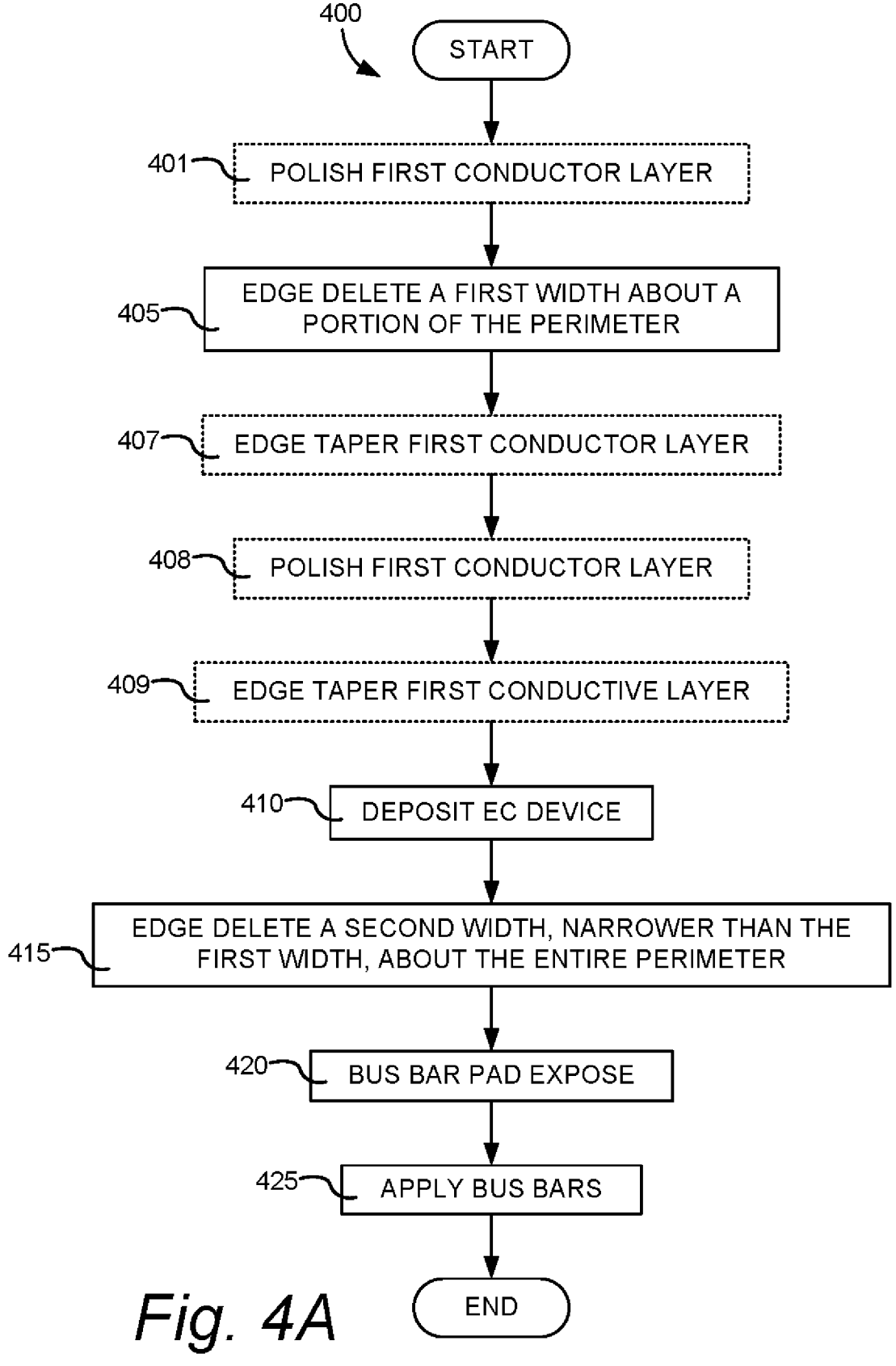
FIG. 4A is a flowchart of a process flow describing aspects of a method of fabricating an electrochromic device.
Figure 4B:
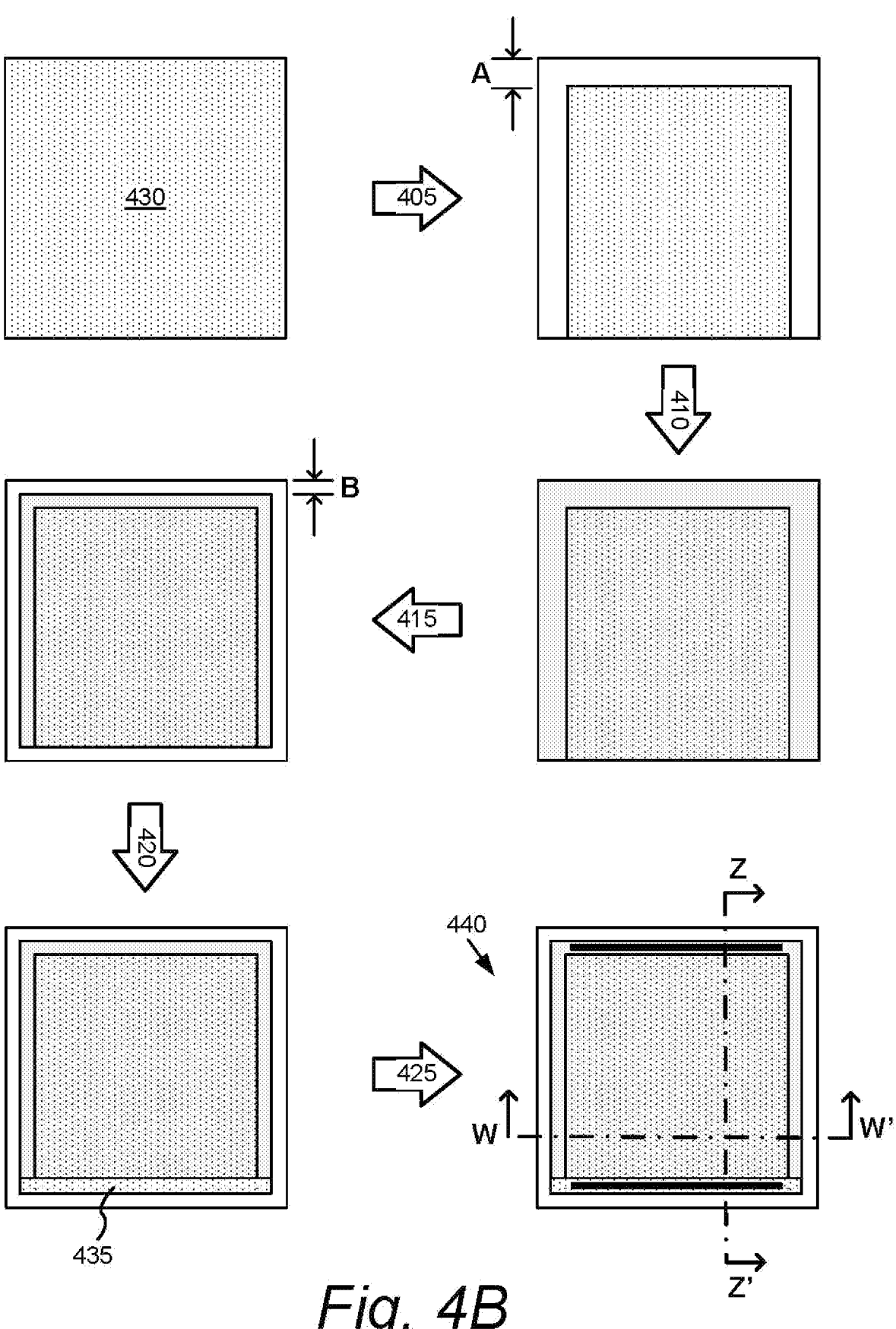
FIG. 4B are top views depicting steps in the process flow described in relation to FIG. 4A.
Figure 4C:
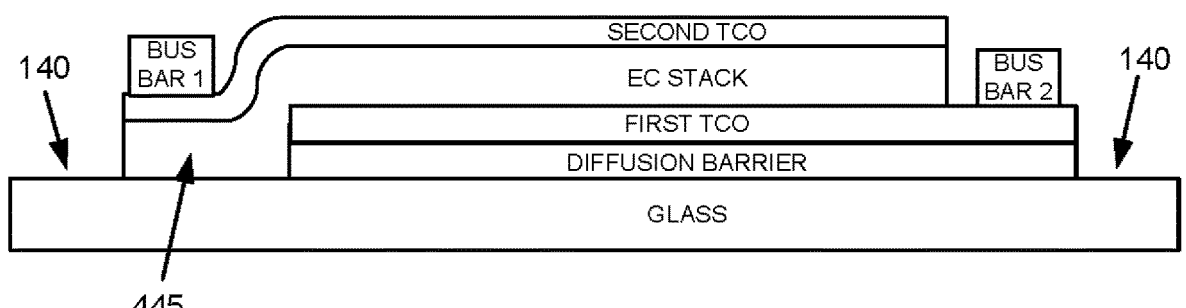
FIG. 4C depicts cross-sections of the electrochromic lite described in relation to FIG. 4B.
Figure 4C:
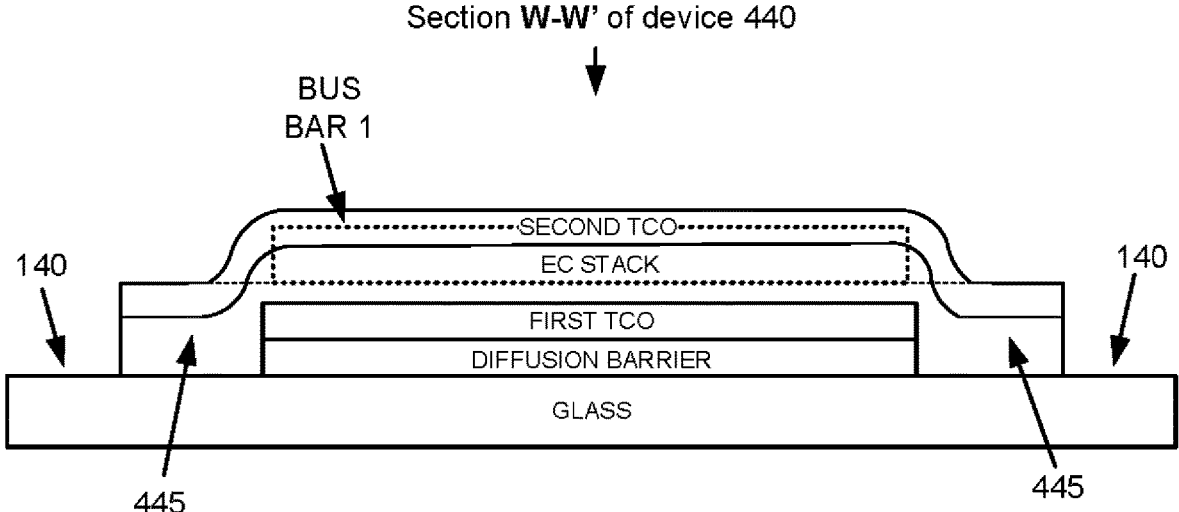

FIG. 4A is a process flow, 400, describing aspects of a method of fabricating an electrochromic device or other optical device having opposing bus bars, each applied to one of the conductor layers of the optical device. The dotted lines denote optional steps in the process flow. An exemplary device, 440, as described in relation to FIGS. 4B-C, is used to illustrate the process flow. FIG. 4B provides top views depicting the fabrication of device 440 including numerical indicators of process flow 400 as described in relation to FIG. 4A. FIG. 4C shows cross-sections of the lite including device 440 described in relation to FIG. 4B. Device 440 is a rectangular device, but process flow 400 applies to any shape of optical device having opposing bus bars, each on one of the conductor layers.

Referring to FIGS. 4A and 4B, after receiving a substrate with a first conductor layer thereon, process flow 400 begins with an optional polishing of the first conductor layer, see 401. Polishing a lower transparent conductor layer may enhance the optical properties of, and performance of, EC devices fabricated thereon. Polishing of transparent conducting layers prior to electrochromic device fabrication thereon is described in patent application, PCT/US12/57606, titled, "Optical Device Fabrication," filed on Sep. 27, 2012, which is hereby incorporated by reference in its entirety. Polishing, if performed, may be done prior to an LED process, see 405, or after an LED in the process flow. In some examples, the lower conductor layer may be polished both before and after edge deletion. Typically, the lower conductor layer is polished only once.

Referring again to FIG. 4A, if polishing 401 is not performed, process 400 begins with edge deleting a first width about a portion of the perimeter of the substrate, see 405. The edge deletion may remove only the first conductor layer or may also remove a diffusion barrier, if present. In one embodiment, the substrate is glass and includes a sodium diffusion barrier and a transparent conducting layer thereon, e.g. a tin-oxide based transparent metal oxide conducting layer. The substrate may be rectangular (e.g., the square substrate depicted in see FIG. 4B). The dotted area in FIG. 4B denotes the first conductor layer. Thus, after edge deletion according to process 405, a width A is removed from three sides of the perimeter of substrate 430. This width is typically, but not necessarily, a uniform width. A second width, B, is described below. Where width A and/or width B are not uniform, then their relative magnitudes with respect to each other are in terms of their average width.

As a result of the removal of the first width A at 405, there is a newly exposed edge of the lower conductor layer. Optionally, at least a portion of this edge of the first conductive layer may be optionally tapered, see 407 and 409. The underlying diffusion barrier layer may also be tapered.

The lower conductor layer may also, optionally, be polished after edge tapering, see 408. It has been found, that with certain device materials, it may be advantageous to polish the lower conductor layer after the edge taper. For example, the edge taper may be performed after polish 408, see 409. Although edge tapering is shown at both 407 and 409 in FIG. 4A, if performed, edge tapering would typically be performed once (e.g., at 407 or 409).

After removal of the first width A, and optional polishing and/or optional edge tapering as described above, the EC device is deposited over the surface of substrate 430, see 410. This deposition includes one or more material layers of the optical device and the second conducting layer, e.g. a transparent conducting layer such as indium tin oxide (ITO).

The LED process may be performed at least to remove material including the transparent conductor layer on the substrate, and optionally also removing a diffusion barrier if present. In certain embodiments, edge deletion is used to remove a surface portion of the substrate, e.g. float glass, and may go to a depth not to exceed the thickness of the compression zone. Edge deletion is performed, e.g., to create a good surface for sealing by at least a portion of the primary seal and the secondary seal of the IGU. For example, a transparent conductor layer can sometimes lose adhesion when the conductor layer spans the entire area of the substrate and thus has an exposed edge, despite the presence of a secondary seal. Also, it is believed that when metal oxide and other functional layers have such exposed edges, they can serve as a pathway for moisture to enter the bulk device and thus compromise the primary and secondary seals.

LED is described herein as being performed on a substrate that is already cut to size. However, edge deletion can be done before a substrate is cut from a bulk glass sheet in other disclosed embodiments. For example, non-tempered float glass may be cut into individual lites after an EC device is patterned thereon. Methods described herein can be performed on a bulk sheet and then the sheet cut into individual EC lites. In certain embodiments, edge deletion may be carried out in some edge areas prior to cutting the EC lites, and again after they are cut from the bulk sheet. In certain embodiments, all edge deletion is performed prior to excising the lites from the bulk sheet. In embodiments employing "edge deletion" prior to cutting the panes, portions of the coating on the glass sheet can be removed in anticipation of where the cuts (and thus edges) of the newly formed EC lites will be. In other words, there is no actual substrate edge yet, only a defined area where a cut will be made to produce an edge. Thus "edge deletion" is meant to include removing one or more material layers in areas where a substrate edge is anticipated to exist. Methods of fabricating EC lites by cutting from a bulk sheet after fabrication of the EC device thereon are described in U.S. patent application Ser. No. 12/941,882 (now U.S. Pat. No. 8,164,818), filed Nov. 8, 2010, and U.S. patent application Ser. No. 13/456,056, filed Apr. 25, 2012, each titled "Electrochromic Window Fabrication Methods" each of which is hereby incorporated by reference in its entirety.

In some examples, material may be removed by laser ablation. The ablation can be performed from either the substrate side or the EC film side depending on the choice of the substrate handling equipment and configuration parameters.

Conventionally, the energy density required to ablate the film thickness has been achieved by passing the laser beam through an optical lens. The lens focuses the laser beam to the desired shape and size. For example, a "top hat" beam configuration has been used, e.g., having a focus area of between about $0.005$ $mm^2$ to about $2$ $mm^2$. The focusing level of the beam has been selected to achieve the required energy density to ablate the EC film stack. For example the energy density used in the ablation may be between about $2$ $J/cm^2$ and about $6$ $J/cm^2$.

During a laser edge delete process, a laser spot may be scanned over the surface of the EC device, along the periphery. Homogeneous removal of the EC film is desired, and this has been accomplished by, for example, overlapping the spots' area during scanning, the overlap extending, in known examples, between about 5% and about 100%, between about 10% and about 90%, and between about 10% and about 80%. Various scanning patterns have been used, e.g., scanning in straight lines, curved lines, and various patterns may be scanned, e.g., rectangular or other shaped sections are scanned which, collectively, create the peripheral edge deletion area. The scanning lines (or "pens," i.e. lines created by adjacent or overlapping laser spots, e.g. square, round, etc.) may be overlapped at the levels described above for spot overlap. That is, the area of the ablated material defined by the path of the line previously scanned is overlapped with later scan lines so that there is overlap. That is, a pattern area ablated by overlapping or adjacent laser spots is overlapped with the area of a subsequent ablation pattern. Where overlapping is needed, spots, lines or patterns, a higher frequency laser, e.g. in the range of between about 11 KHz and about 500 KHz, may be used.

Referring again to FIGS. 4A and 4B, process flow 400 continues with removing a second width, B, narrower than the first width A, about substantially the entire perimeter of the substrate, see 415. This may include removing material down to the glass or to a diffusion barrier, if present. After process flow 400 is complete up to 415, e.g. on a rectangular substrate as depicted in FIG. 4B, there is a perimeter area, with at least width B, where there is none of the first transparent conductor, the one or more material layers of the device, or the second conducting layer—removing width B has exposed diffusion barrier or substrate. Within this perimeter area is the device stack, including the first transparent conductor surrounded on three sides by overlapping one or more material layers and the second conductor layer. On the remaining side (e.g., the bottom side in FIG. 4B) there is no overlapping portion of the one or more material layers and the second conductor layer. It is proximate this remaining side (e.g., bottom side in FIG. 4B) that the one or more material layers and the second conductor layer are removed in order to expose a portion (bus bar pad expose, or "BPE"), 435, of the first conductor layer, see 420. The BPE 435 need not run the entire length of that side, it need only be long enough to accommodate the bus bar and leave some space between the bus bar and the second conductor layer so as not to short on the second conductor layer. In one embodiment, the BPE 435 spans the length of the first conductor layer on that side.

As described above, a BPE is where a portion of the material layers are removed down to the lower electrode or other conductive layer (e.g. a transparent conducting oxide layer), in order to create a surface for a bus bar to be applied and thus make electrical contact with the electrode. The bus bar applied can be a soldered bus bar, and ink bus bar and the like. A BPE typically has a rectangular area, but this is not necessary; the BPE may be any geometrical shape or an irregular shape. For example, depending upon the need, a BPE may be circular, triangular, oval, trapezoidal, and other polygonal shapes. The shape may be dependent on the configuration of the EC device, the substrate bearing the EC device (e.g. an irregular shaped window), or even, e.g., a more efficient (e.g. in material removal, time, etc.) laser ablation pattern used to create it. Typically, but not necessarily, the BPE is wide enough to accommodate the bus bar, but should allow for some space at least between the active EC device stack and the bus bar. As mentioned, a bus bar may be between about 1 mm and about 5 mm wide, typically about 3 mm wide.

As mentioned, the BPE is, advantageously, fabricated wide enough to accommodate the bus bar's width and also leave space between the bus bar and the EC device (as the bus bar is only supposed to touch the lower conductive layer). When the bus bar width is fully accommodated by the BPE, that is, the bus bar is entirely atop the lower conductor, the outer edge, along the length, of the bus bar may be aligned with the outer edge of the BPE, or inset by about 1 mm to about 3 mm. Likewise, the space between the bus bar and the EC device is between about 1 mm and about 3 mm, in another embodiment between about 1 mm and 2 mm, and in another embodiment about 1.5 mm. Formation of BPEs is described in more detail below, with respect to an EC device having a lower electrode that is a TCO. This is for convenience only, the electrode could be any suitable electrode for an optical device, transparent or not.

To make a BPE, an area of the bottom TCO (e.g. first TCO) may be cleared of deposited material so that a bus bar can be fabricated on the TCO. This may be achieved by laser processing which selectively removes the deposited film layers while leaving the bottom TCO exposed in a defined area at a defined location.

The electromagnetic radiation used to fabricate a BPE may be the same as described above for performing LED. That is, laser ablation, performed from either the glass side or the film side, may be contemplated. Conventionally, the energy density required to ablate the film thickness has been achieved by passing the laser beam through an optical lens. The lens focuses the laser beam to the desired shape and size. For example, a "top hat" has been used having the dimensions described above, having an energy density of between about $0.5$ $J/cm^2$ and about $4$ $J/cm^2$. Moreover, laser scan overlapping for BPE has been proposed as described above for laser edge deletion. In certain embodiments, variable depth ablation may be used for BPE fabrication.

Referring again to FIGS. 4A and 4B, after forming the BPE, bus bars may applied to the device, one on exposed area 435 of the first conductor layer (e.g., first TCO) and one on the opposite side of the device, on the second conductor layer (e.g., second TCO), on a portion of the second conductor layer that is not above the first conductor layer, see 425.

FIG. 4B indicates cross-section cuts Z-Z' and W-W' of device 440. The cross-sectional views of device 440 at Z-Z' and W-W' are shown in FIG. 4C. The depicted layers and dimensions are not to scale, but are meant to represent functionally the configuration. In this example, the diffusion barrier was removed when width A and width B were fabricated. Specifically, perimeter area 140 is free of first conductor layer and diffusion barrier; although in some examples the diffusion barrier may be left intact to the edge of the substrate about the perimeter on one or more sides. In another example, the diffusion barrier may be co-extensive with the one or more material layers and the second conductor layer (thus width A is fabricated at a depth to the diffusion barrier, and width B is fabricated to a depth sufficient to remove the diffusion barrier). In this example, there is an overlapping portion, 445, of the one or more material layers about three sides of the functional device. On one of these overlapping portions, on the second TCO, bus bar 1 is fabricated.

FIG. 4C depicts the device layers overlying the first TCO, particularly the overlapping portion, 445. Although not to scale, cross section Z-Z' for example, depicts the conformal nature of the layers of the EC stack and the second TCO following the shape and contour of the first TCO including the overlapping portion 445.

Figure 4D:
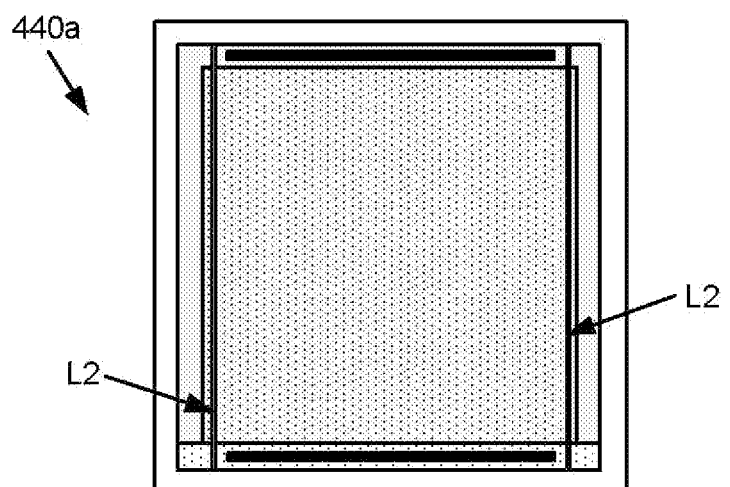
FIG. 4D is a schematic drawing of top views of devices similar to that described in relation to FIG. 4B.
Figure 4D:
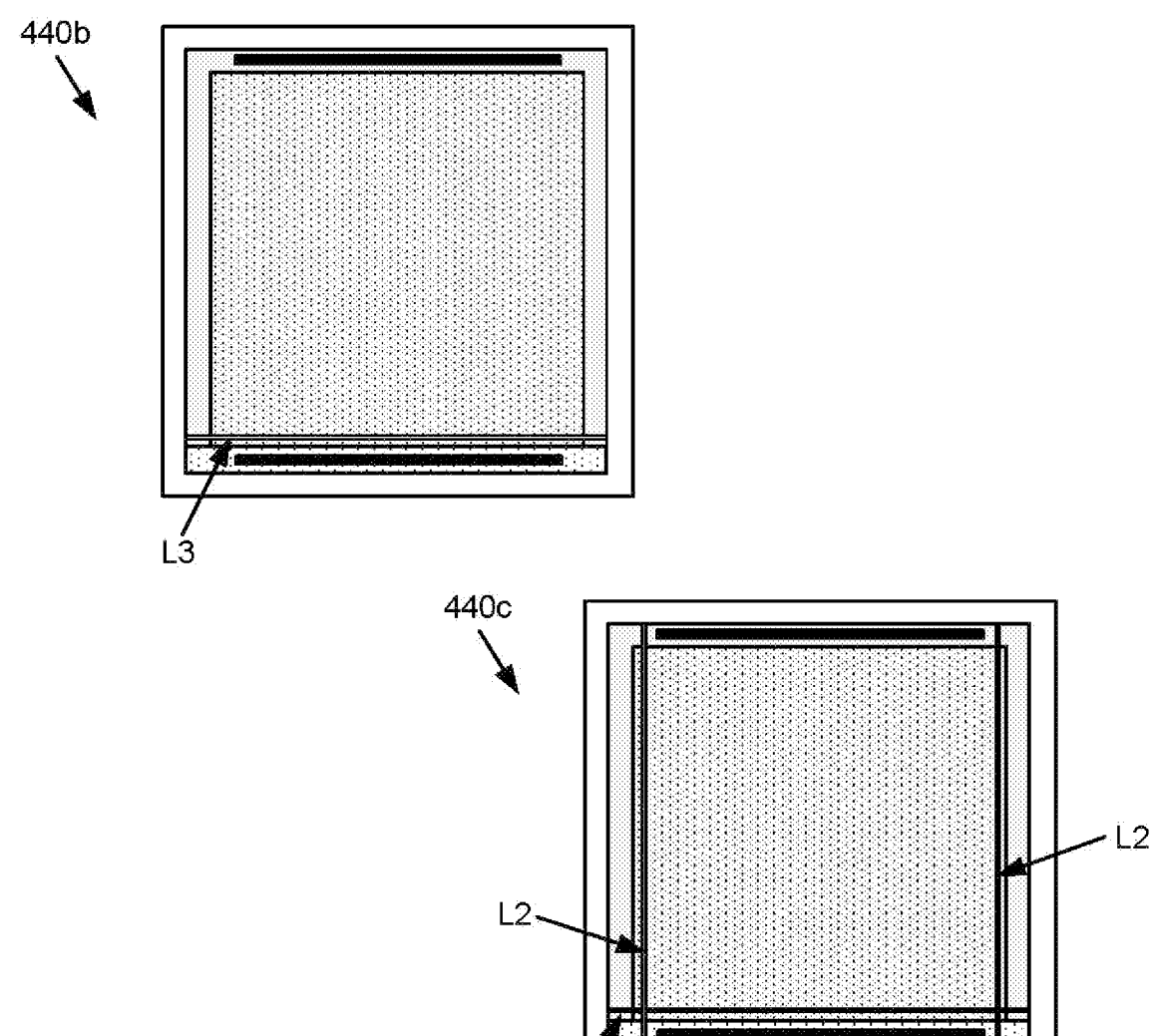

Conventionally, one or more laser isolation scribes have been required, depending upon design tolerances, material choice and the like. FIG. 4D depicts top-views of three devices, 440a, 440b and 440c, each of which are variations on device 440 as depicted in FIGS. 4B and 4C. Device 440a is similar to device 440, but includes L2 scribes (see above) that isolate first portions of the EC device along the sides orthogonal to the sides with the bus bars. Device 440b is similar to device 440, but includes an L3 scribe isolating and deactivating a second portion of the device between the bus bar on the first (lower) conductor layer and the active region of the device. Device 440c is similar to device 440, but includes both the L2 scribes and the L3 scribe. Although the scribe line variations in FIG. 4D are described in reference to devices 440a, 440b and 440c, these variations can be used for any of the optical devices and lites of embodiments described herein.

Figure 4E:
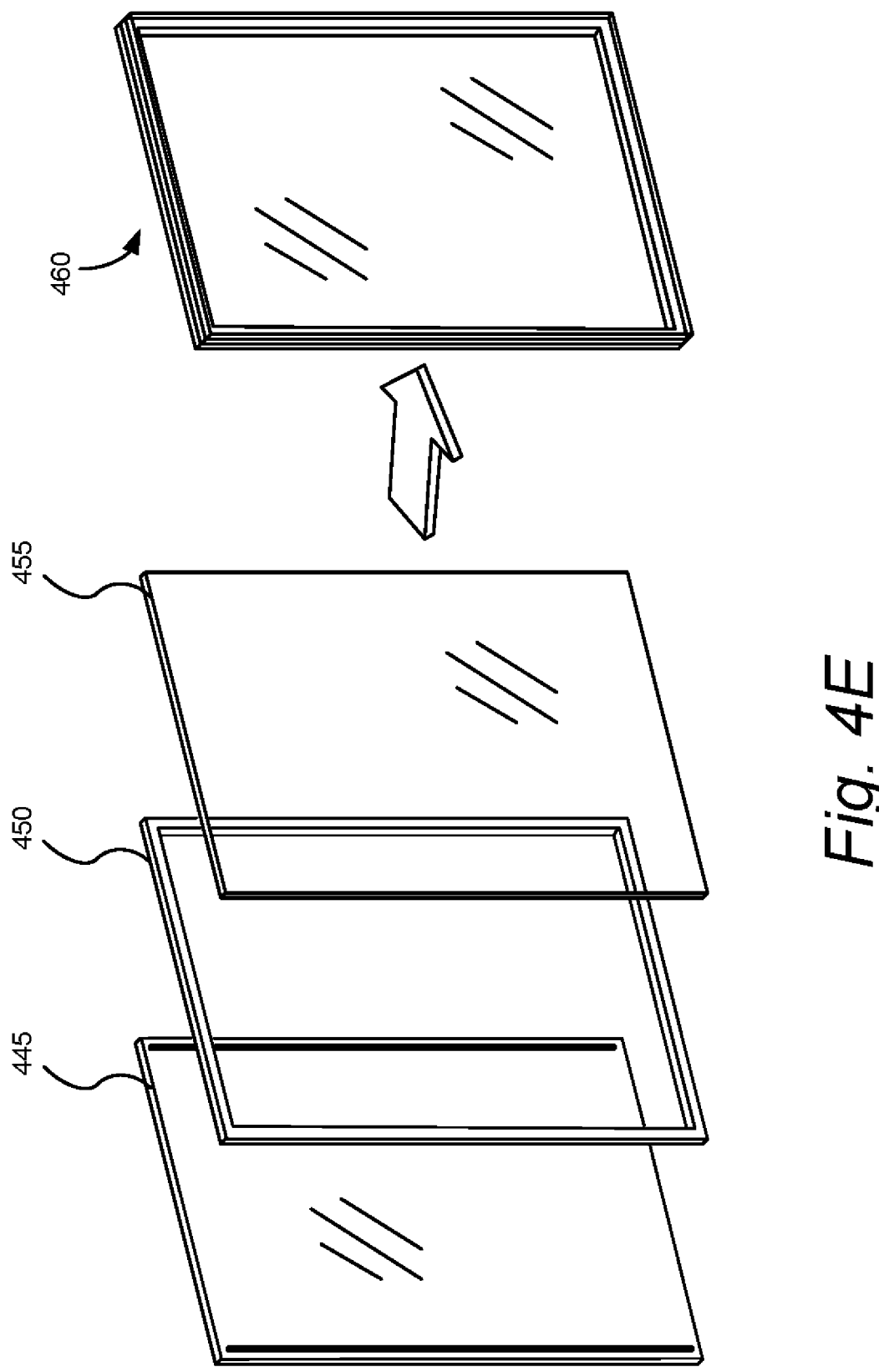
FIG. 4E is a schematic drawing in the perspective view depicting fabrication of an IGU with an optical device.

Whatever the shape of the device, it can be incorporated into an insulated glass unit. Preferably, the device is configured inside the IGU so as to protect it from moisture and the ambient. FIG. 4E depicts IGU fabrication where the optical device, e.g. an electrochromic device is sealed within the IGU. IGU, 460, including a first substantially transparent substrate, 445, a spacer, 450, and a second substantially transparent substrate, 455. Substrate 445 has an electrochromic device fabricated thereon (bus bars are shown as dark vertical lines on substrate 445). When the three components are combined, where spacer 450 is sandwiched in between and registered with substrates 445 and 455, IGU 460 is formed. The IGU has an associated interior space defined by the faces of the substrates in contact with adhesive sealant between the substrates and the interior surfaces of the spacer, in order to hermetically seal the interior region and thus protect the interior from moisture and the ambient. This is commonly referred to as the primary seal of an IGU. A secondary seal includes an adhesive sealant applied around the spacer and between the panes of glass (the spacer has smaller length and width than the substrates so as to leave some space between the glass substrates from the outer edge to the spacer; this space is filled with sealant to form the secondary seal). In certain embodiments, any exposed areas of the first conducting layer are configured to be within the primary seal of the IGU. In one embodiment, any bus bars are also configured to be within the primary seal of the IGU.

In one embodiment, the area of the second conductor layer that is not over the first conductor layer is also configured to be within the primary seal of the IGU. Conventional electrochromic IGU's configure the bus bars either outside the spacer (in the secondary seal) or inside the spacer (in the interior volume of the IGU) in the viewable area of the IGU (sometimes one in the secondary seal, the other in the viewable area). Conventional electrochromic IGU's also configure the EC device edges either running to the substrate edge or inside the spacer (within the interior volume of the IGU). The inventors have found it advantageous to configure the bus bars, laser scribes, and the like to be under the spacer, so as to keep them from the viewable area and, e.g., to free up the secondary seal so that electrical components therein do not interfere with the aforementioned features. Such IGU configurations are described in U.S. patent application Ser. No. 13/456,056, titled "Electrochromic Window Fabrication Methods," filed Apr. 25, 2012, which is hereby incorporated by reference in its entirety. Controllers that fit into the secondary seal are described in U.S. Pat. No. 8,213,074, titled "Onboard Controllers for Multistate Windows," filed Mar. 16, 2011, which is hereby incorporated by reference in its entirety. Methods described herein include sealing any exposed areas of the first conductor layer, edges of the device or overlapping regions of the one or more material layers, and the second conductor layer in the primary seal of the IGU. With or without a vapor barrier layer, such as silicon oxide, silicon aluminum oxide, silicon oxynitride, and the like, this sealing protocol provides superior moisture resistance to protect the electrochromic device while maximizing viewable area.

In certain embodiments, the fabrication methods described herein are performed using large-area float glass substrates, where a plurality of EC lites are fabricated on a single monolithic substrate and then the substrate is cut into individual EC lites. Similar, "coat then cut" methods are described in U.S. Pat. No. 8,164,818, filed Nov. 8, 2010, and titled, "Electrochromic Window Fabrication Methods," which is hereby incorporated by reference in its entirety. In some embodiments, these fabrication principles are applied to the methods described herein, e.g., in relation to FIGS. 4A-4D.

Figure 4F:
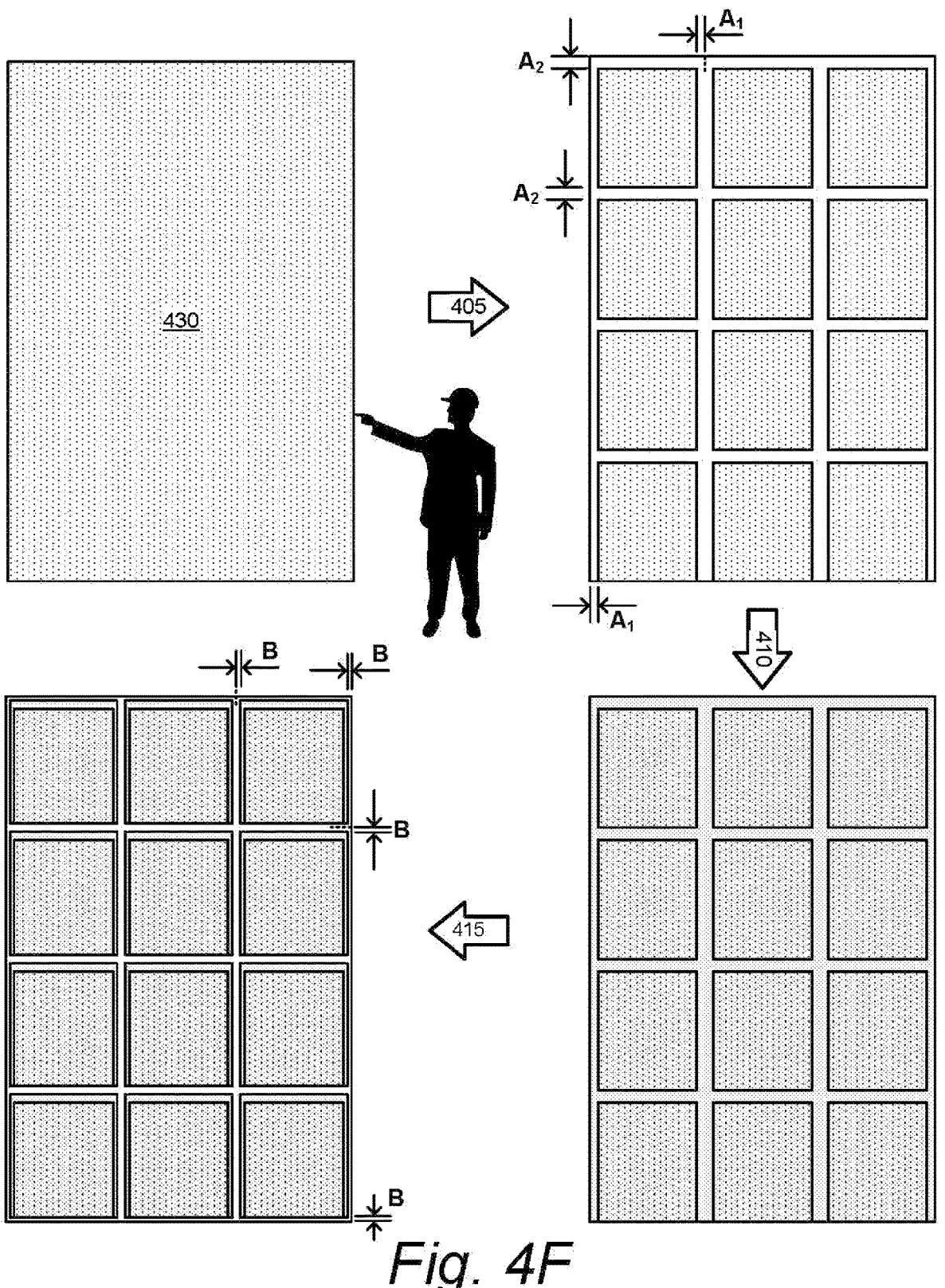
FIGS. 4F and 4G are schematic drawings depicting steps of a process flow similar to that described in relation to FIG. 4A and carried out on a large-area substrate as applied to coat then cut methods.
Figure 4G:
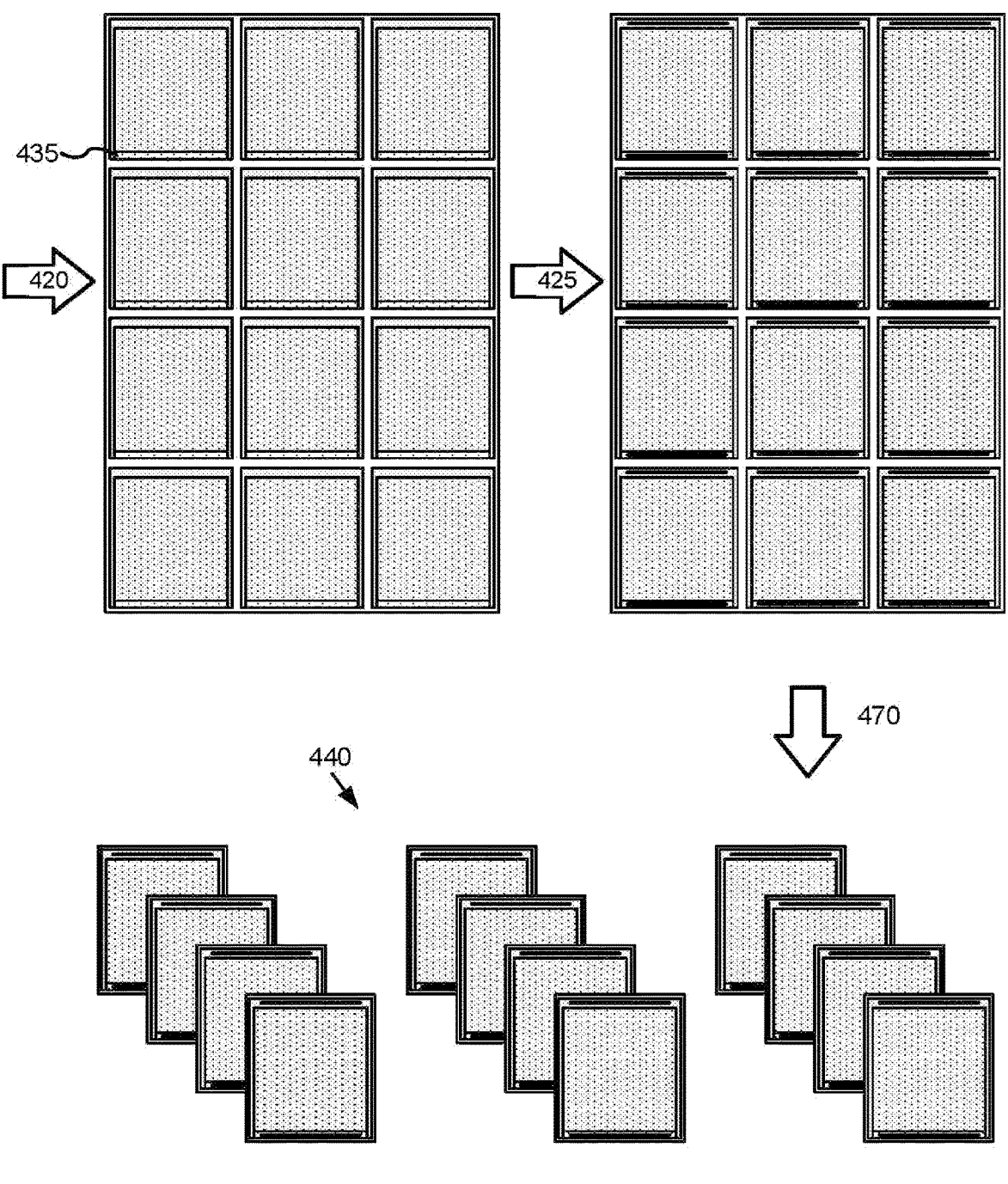

FIGS. 4F and 4G depict an EC lite fabrication process flow, similar to that described in relation to FIG. 4A, but carried out on a large-area substrate as applied to coat then cut methods, according to some examples. These fabrication methods can be used to make EC lites of varying shapes, e.g., as described herein, but in this example, rectangular EC lites are described. In this example, substrate 430 (e.g. as described in relation to FIG. 4A, coated with a transparent conducting oxide layer) is a large-area substrate, such as float glass, e.g. a sheet of glass that is 5 feet by 10 feet. Analogous to operation 405 as described in relation to FIG. 4A, edge deletion at a first width, A, is performed. Edge taper and/or polish may also be performed. In this example, since there are to be a plurality of EC devices (in this example, 12 devices) fabricated on a large substrate, the first width A may have one or more components. In this example, there are two components, $A_1$ and $A_2$, to width A. First, there is a width $A_1$, along the vertical (as depicted) edges of the substrate. Since there are neighboring EC devices, the width $A_1$ is reflected in a coating removal that is twice the width $A_1$. In other words, when the individual devices are cut from the bulk sheet, the cuts in between neighboring devices along the vertical (as depicted) dimension will evenly bifurcate the area where the coating is removed. Thus "edge deletion" in these areas accounts for where glass edges will eventually exist after the glass is cut (see for example FIG. 4G). Second, along the horizontal dimension, a second A-width component, $A_2$, is used. Note, although width $A_1$ may be applied about the entire perimeter of the substrate, in the illustrated example more width is provided to accommodate the bus bar that will fabricated on the top transparent conductor layer (e.g. see FIG. 4C, bus bar 1). In this example, width $A_2$ is the same both at the top and bottom edge of the substrate and between neighboring EC devices. This is because the fabrication is analogous to that described in relation to FIG. 4B, i.e., where the EC devices are cut from the substrate along the bottom of edge of the transparent conductor area for each device (see FIG. 4D).

Next, in operation 410, the remaining layers of the EC device are deposited over the entire substrate surface (save any areas where clamps might hold the glass in a carrier, for example). The substrate may be cleaned prior to operation 410, e.g., to remove contaminants from the edge deletion. Also edge taper on each of the TCO areas may be performed. The remaining layers of the EC device encapsulate the isolated regions of the transparent conductor on the substrate, because they surround these areas of transparent conductor (except for the back face which resides against the substrate or intervening ion barrier layer). In one example, operation 410 is performed in a controlled-ambient all PVD process, where the substrate doesn't leave the coating apparatus or break vacuum until all the layers are deposited.

In operation 415, edge deletion at a second width, B, narrower than the first width A, is performed. In this example, second width B is uniform. In between neighboring devices, second width B is doubled to account for cutting the substrate along lines evenly between two devices so that the final devices have a uniform edge delete about them for the spacer to seal to the glass when an IGU is fabricated from each EC device. As illustrated in FIG. 4F, this second edge deletion isolates individual EC lites on the substrate. In some examples, the second width B may be much smaller than that needed to accommodate a spacer for IGU fabrication. That is, the EC lite may be laminated to another substrate and thus only a small edge delete at width B, or in some embodiments no edge delete at the second width B is necessary.

Referring to FIG. 4G, operation 420 includes fabricating a BPE, 435, where a portion of the EC device layers are removed to expose the lower conductor layer proximate the substrate. In this example, that portion is removed along the bottom (as depicted) edge of each EC device. Next, during operation 425, bus bars are added to each device. In certain embodiments, the EC lites are excised from the substrate prior to bus bar application. The substrate now has completed EC devices. Next, the substrate is cut, operation 470, to produce a plurality of EC lites 440, in this example 12 lites. In certain embodiments the individual EC lites are tested and optionally any defects mitigated prior to cutting the large format sheet.

Coat and then cut methods allow for high throughput manufacture because a plurality of EC devices can be fabricated on a single large area substrate, as well as tested and defect-mitigated prior to cutting the large format glass sheet into individual lites. For example, the large format glass pane may be laminated with individual strengthening panes registered with each EC device prior to cutting the large format sheet. The bus bars may or may not be attached prior to lamination; for example, the mate lite may be coextensive with an area allowing some exposed portions of the top and bottom TCO's for subsequent bus bar attachment. In another example, the mate lite is a thin flexible material, such as a thin flexible glass described below, which is substantially co-extensive with the EC device or the entire large format sheet. The thin flexible mate lite is ablated (and lamination adhesive, if present in these areas) down to the first and second conductor layers so that bus bars may be attached to them as described herein. In yet another embodiment, the thin flexible mate lite, whether co-extensive with the entire large format sheet or the individual EC devices, is configured with apertures which are registered with the top conductor layer and the BPE during lamination. The bus bars are attached either before or after lamination with the mate lite, as the apertures allow for either operation sequence. The lamination and bus bar attachment may separately be performed prior to cutting the large sheet, or after.

As indicated above, in the absence of the presently disclosed techniques, laser ablation techniques for multi-layer thin-film devices having one or more material layers sandwiched between two thin-film electrical conductor layers contemplated a focused laser beam. The focused laser beam contemplated a focus area (spot size) of, for example, about $0.005 \text{ mm}^2$ to about $2 \text{ mm}^2$. This focusing level was selected to achieve the required energy density to ablate the EC film stack. For example the energy density used in the ablation may be in the range of about $20 \text{ mJ/mm}^2$ to about $60 \text{ mJ/mm}^2$ (i.e., the corresponding laser energy is about 0.1 to 120 mJ). Relatively short pulse durations of $10^{-11}$ seconds to $5*10^{-8}$ seconds were contemplated to be applied at a relatively high frequency (>KHz).

The present inventors have appreciated that, advantageously, a higher energy laser (about 300-1500 mJ vs 10-50 mJ) may be applied in a collimated (defocused) manner to provide a larger spot size (e.g., at least about $0.2 \text{ cm}^2$ vs <1 $\text{mm}^2$). Longer duration pulses (e.g., tens of nano seconds) applied at a lower frequency (e.g., about 1-1000 Hz, in some implementations) have also been found to be advantageous. Advantageously, the contemplated laser operating parameters provide for an average energy density similar to those described above in connection with prior art.

The present inventors have found that such a high energy, non-focused laser may be configured to ablate material from a several millimeters spot diameter in as little as a single pulse. Moreover, the present techniques reduce complexity of the apparatus by obviating a need for focusing lenses, autofocus apparatus and the like. Furthermore, the larger spot size reduces or even eliminates any need for raster scanning while providing a BPE width that fully accommodates the bus bar and allows conservative separation between the bus bar and BPE edge. For example, in some embodiments the separation may be about 4 mm, which is wide enough to avoid the electrical contact with upper conductor.

In some implementations, a dual wavelength laser may be contemplated, so as to improve energy absorption of different layers of the multilayer stack. For example, a laser simultaneously outputting light of 1064 nm wavelength and 532 nm wavelength has been considered.

Figure 5:
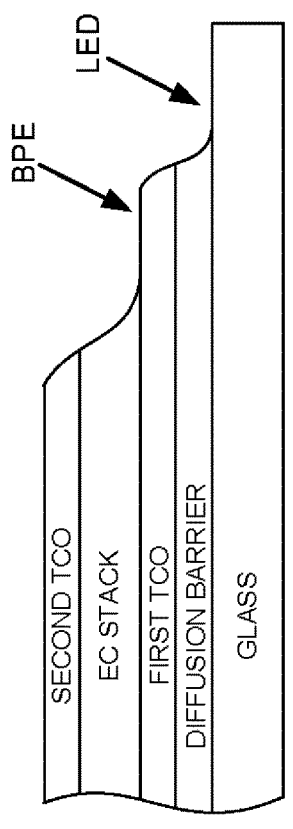
FIG. 5 illustrates a comparison of laser ablation according to the prior art with the presently disclosed techniques.
Figure 5:
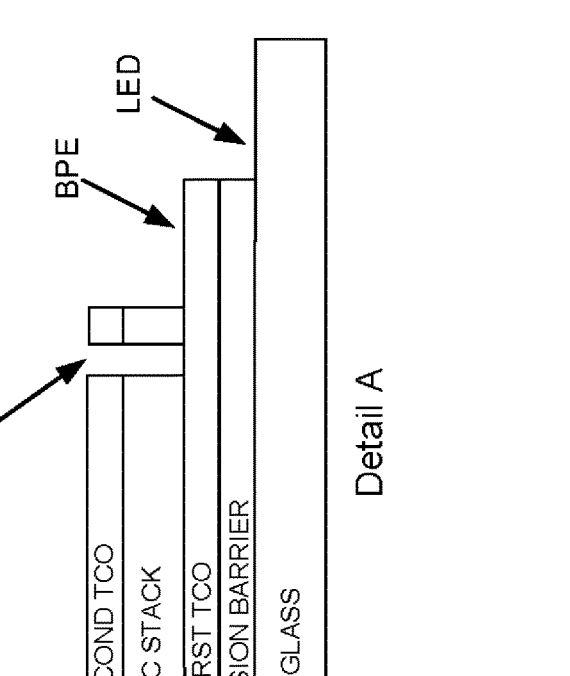

FIG. 5 illustrates a comparison of laser ablation according to the prior art with the presently disclosed techniques. In Detail A, according to the prior art, three discrete laser ablation areas are required (L3, BPE and LED). Detail B illustrates that the present techniques facilitate the omission of the L3 ablation area (isolation scribe). This is because, advantageously, edges of the ablation area formed by the unfocused laser beam (which has a Gaussian energy distribution) are sloped (as opposed to having vertical edges). As a result, a greater separation between exposed conductive layers is assured, and a need for an additional electrical isolation scribe is eliminated.

The BPE area may have a width of about 6 mm in some implementations. In the absence of the presently disclosed techniques such a width may be approximately 10 times the diameter of the focused laser beam's spot diameter. As a result raster scanning of the laser beam and/or of the workpiece would conventionally be required in order to achieve the required width. Advantageously, the present techniques provide a collimated laser beam diameter approximately the same as the desired BPE area width and raster scanning may be avoided. As a result, apparatus complexity and fabrication processing time are both reduced.

Figure 6:
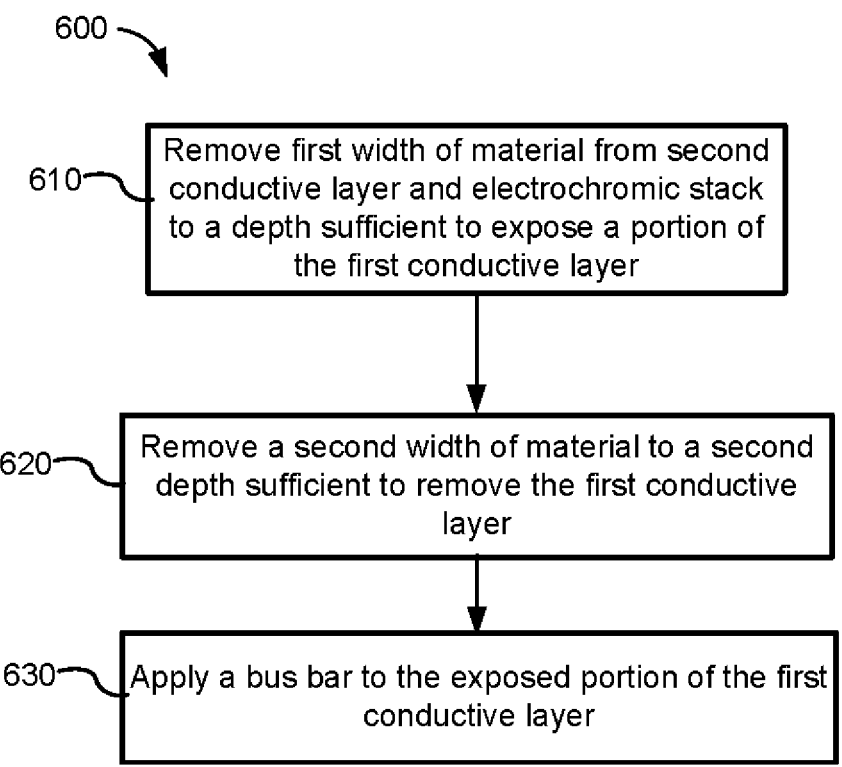
FIG. 6 illustrates a method for fabricating an optical device according to some embodiments.

Referring now to FIG. 6, a method 600 for fabricating an optical device will be described. As indicated above, the optical device may include a substrate and, sandwiched between a first conductive layer proximate to the substrate and a second conducting layer distal from the substrate, an electrochromic stack. At block 610, a first width of material may be removed from the second conductive layer and the electrochromic stack proximal to the perimeter of the substrate. A depth of removal may be sufficient to expose a portion of the first conductive layer At block 620, second width of material, narrower than the first width, at the periphery of the substrate along substantially the entire perimeter of the substrate may be removed to a second depth, the second depth being at least sufficient to remove the first conducting layer.

At block 630 a bus bar may be applied to the exposed portion of the first transparent conducting layer. Advantageously, removing the first width and removing the second width is performed with a substantially collimated laser beam and configured as pulses of electromagnetic radiation having an energy density from about 1 J/cm$^2$ to about 10 J/cm$^2$ in a spot having a characteristic dimension of at least about 5 mm at the surface of the first conductive layer.

Conclusion

It should be understood that the certain embodiments described herein can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software.

Any of the software components or functions described in this application, may be implemented as software code to be executed by a processor using any suitable computer language such as, for example, Java, C++ or Python using, for example, conventional or object-oriented techniques. The software code may be stored as a series of instructions, or commands on a computer-readable medium, such as a random-access memory (RAM), a read-only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

Although the foregoing embodiments have been described in some detail for purposes of clarity of understanding, it will be apparent that certain changes and modifications may be practiced within the scope of the appended claims. It should be noted that there are many alternative ways of implementing the processes, systems, and apparatus of the present embodiments. Additionally, one or more features from any embodiment may be combined with one or more features of any other embodiment without departing from the scope of the disclosure. Further, modifications, additions, or omissions may be made to any embodiment without departing from the scope of the disclosure. The components of any embodiment may be integrated or separated according to particular needs without departing from the scope of the disclosure. Accordingly, the present embodiments are to be considered as illustrative and not restrictive, and the embodiments are not to be limited to the details given herein.

What is claimed is:

1. A method of removing a material from a surface of a workpiece, the method comprising:
directing a laser beam onto a first position on the surface of the workpiece, wherein the laser beam is collimated to an angular divergence of 1 milliradian or less and comprises pulses of electromagnetic radiation having an energy density from 1 J/cm2 to 10 J/cm2 in a spot having a characteristic dimension of at least 5 mm at the surface of the workpiece, wherein the laser beam removes the material from the first position on the surface of the workpiece;
moving the laser beam to a second position on the surface of the workpiece and removing the material from the second position on the surface of the workpiece; and
moving the laser beam to one or more additional positions on the surface of the workpiece and removing the material from the one or more additional positions on the surface of the workpiece.

2. The method of claim 1, wherein the surface of the workpiece comprises an electrochromic device or a partially fabricated electrochromic device on a transparent substrate, and the material comprises one or more layers of the electrochromic device.

3. The method of claim 2, wherein removing the material produces an edge on the one or more layers of the electrochromic device, and wherein the edge has a tapered profile.

4. The method of claim 1, wherein removing the material forms a bus bar pad expose region, the bus bar pad expose region comprising an exposed portion of the surface of a transparent conductive layer.

5. The method of claim 1, wherein:
the surface of the workpiece comprises an electrochromic device comprising an electrochromic stack between a first transparent conductive layer and a second transparent conductive layer, and
removing material from the first position, the second position, and/or the one or more additional positions on the surface of the workpiece comprises removing a portion of the first transparent conductive layer, a portion of the electrochromic stack, and/or a portion of the second transparent conductive layer.

6. The method of claim 1, wherein removing material from the first position, the second position, and/or the one or more additional positions on the surface of the workpiece produces an edge delete region disposed on at least a portion of a perimeter of the workpiece, the edge delete region comprising an exposed portion of the surface of the workpiece.

7. The method of claim 1, wherein the laser beam is not focused on the surface of the workpiece.

8. The method of any of claim 1, wherein the pulses of electromagnetic radiation comprise radiation of at least two wavelengths.

9. The method of claim 8, further comprising controlling proportions of the laser beam provided in a first wavelength and in a second wavelength.

10. The method of claim 8, wherein the pulses of electromagnetic radiation comprise radiation of a first wavelength in a visible range and radiation of a second wavelength in an infrared range.

11. The method of claim 1, wherein the laser beam is produced by a neodymium YAG laser.

12. The method of claim 1, wherein the pulses of electromagnetic radiation have pulse energies of from 300 mJ to 1500 mJ.

13. The method of claim 1, wherein the pulses of electromagnetic radiation have pulse durations of from 1 ns to 100 ns.

14. The method of claim 1, wherein the pulses of electromagnetic radiation have a pulse repetition rate of 1 to 1000 Hz.

15. The method of claim 1, wherein the pulses of electromagnetic radiation have a pulse repetition rate of 50 to 300 Hz.

16. The method of claim 1, wherein at least a portion of the pulses of electromagnetic radiation has a substantially Gaussian energy distribution in the spot at a first distance from a source of the laser beam.

17. The method of claim 1, wherein moving the laser beam to the second position and the one or more additional positions occurs at a velocity of 200 mm/s to 1500 mm/s.

18. The method of claim 1, wherein the spot produced by the pulses of electromagnetic radiation has a substantially square or rectangular shape.

19. A material removal system comprising:
   a laser configured to produce a laser beam collimated to an angular divergence of 1 milliradian or less and comprising pulses of electromagnetic radiation having an energy density from 1 J/cm2 to 10 J/cm2 in a spot having a characteristic dimension of at least 5 mm at a first distance from the laser; and
   a workpiece holder configured to hold a surface of a workpiece at the first distance from the laser;
   wherein the material removal system is configured to provide the laser beam in a substantially collimated shape at the first distance from the laser.

20. The system of claim 19, wherein the laser and the workpiece holder are configured such that, during operation, the laser beam ablates a material from the surface of the workpiece.

21. The system of claim 19, wherein the laser is configured to produce the laser beam with at least two wavelengths.

22. The system of claim 21, further comprising a component configured to control proportions of the laser beam provided in a first wavelength and in a second wavelength.

23. The system of claim 19, wherein the laser is configured to produce the laser beam with radiation of a first wavelength in a visible range and with a second wavelength in an infrared range.

24. The system of claim 19, wherein the laser is configured to produce the pulses of electromagnetic radiation with pulse energies of from 300 mJ to 1500 mJ.

25. The system of claim 19, wherein the laser is configured to produce the pulses of electromagnetic radiation with pulse durations of from 1 ns to 100 ns.

26. The system of claim 19, wherein the laser is configured to produce the pulses of electromagnetic radiation with a pulse repetition rate of 1 to 1000 Hz.

27. The system of claim 19, wherein the laser is configured to produce the pulses of electromagnetic radiation with a pulse repetition rate of 50 to 300 Hz.

28. The system of claim 19, wherein the laser is configured to produce the pulses of electromagnetic radiation with at least a portion having a substantially Gaussian energy distribution in the spot at the first distance from the laser.

29. The system of claim 19, further comprising a beam collimator configured to change a characteristic dimension of the laser beam.

30. The system of claim 19, further comprising a beam shaper configured to change a beam profile distribution of the laser beam.

31. A method of removing a material from a surface of a workpiece, the method comprising:
   directing a laser beam collimated to an angular divergence of 1 milliradian or less onto a first position on the surface of the workpiece, wherein the laser beam comprises pulses of electromagnetic radiation having at least two wavelengths, wherein the pulses of electromagnetic radiation form a spot that removes the material from the first position on the surface of the workpiece;
   moving the laser beam to a second position on the surface of the workpiece and removing the material from the second position on the surface of the workpiece; and
   moving the laser beam to one or more additional positions on the surface of the workpiece and removing the material from the one or more additional positions on the surface of the workpiece.

32. The method of claim 31, further comprising controlling proportions of the laser beam provided in a first wavelength and in a second wavelength.

33. The method of claim 31, wherein the pulses of electromagnetic radiation comprise radiation of a first wavelength in a visible range and radiation of a second wavelength in an infrared range.

34. A material removal system comprising:
   a laser configured to produce a laser beam collimated to an angular divergence of 1 milliradian or less and comprising pulses of electromagnetic radiation having at least two wavelengths in a spot having a characteristic dimension of at least 5 mm at a first distance from the laser; and
   a workpiece holder configured to hold a surface of a workpiece at the first distance from the laser;
   wherein the material removal system is configured to provide the laser beam in a substantially collimated shape at the first distance from the laser.

35. The system of claim 34, further comprising a component configured to control proportions of the laser beam provided in a first wavelength and in a second wavelength.

36. The system of claim 34, further comprising a beam collimator configured to change a characteristic dimension of the laser beam and/or a beam shaper configured to change a beam profile distribution of the laser beam.

37. A method of fabricating an optical device comprising a substrate and, sandwiched between a first conductive layer proximate to the substrate and a second conductive layer distal from the substrate, an electrochromic stack, the method comprising:
   (i) removing a first width of material from the second conductive layer and the electrochromic stack proximal to a perimeter of the substrate to a first depth sufficient to expose a portion of the first conductive layer;

(ii) removing a second width, narrower than the first width, of material at a periphery of the substrate along substantially an entire perimeter of the substrate to a second depth, the second depth being at least sufficient to remove the first conductive layer; and (iii) applying a bus bar to the exposed portion of the first conductive layer;

wherein removing the first width and removing the second width is performed with a laser beam collimated to an angular divergence of 1 milliradian or less and configured as pulses of electromagnetic radiation having an energy density from 1 J/cm2 to 10 J/cm2 in a spot having a characteristic dimension of at least 5 mm at a surface of the first conductive layer.

* * * * *